US006631425B1

(12) United States Patent
Helland et al.

(10) Patent No.: US 6,631,425 B1
(45) Date of Patent: Oct. 7, 2003

(54) JUST-IN-TIME ACTIVATION AND AS-SOON-AS-POSSIBLE DEACTIVATION OR SERVER APPLICATION COMPONENTS

(75) Inventors: Patrick James Helland, Redmond, WA (US); Rodney Limprecht, Woodinville, WA (US); Mohsen Al-Ghosein, Issaquah, WA (US); Wilfred G. Russell, Bellevue, WA (US); Jan Stephen Gray, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 08/959,139

(22) Filed: Oct. 28, 1997

(51) Int. Cl.[7] .................................................. G06F 9/00
(52) U.S. Cl. ....................................... 709/332; 709/315
(58) Field of Search ............................... 709/315, 316, 709/104, 101, 108, 331, 332, 203; 707/206

(56) References Cited

U.S. PATENT DOCUMENTS

| 4,752,928 A | | 6/1988 | Chapman et al. |
| 4,953,080 A | | 8/1990 | Dysart et al. |
| 4,972,437 A | | 11/1990 | Citron et al. |
| 5,075,848 A | | 12/1991 | Lai et al. |
| 5,212,793 A | * | 5/1993 | Donica et al. ............... 395/700 |

(List continued on next page.)

FOREIGN PATENT DOCUMENTS

| EP | 0 414 624 A | 2/1991 |
| EP | 0623876 A2 | 3/1994 |
| EP | 0 674 260 A | 9/1995 |
| EP | 0 738 966 A | 10/1996 |
| EP | 0 777 178 A | 6/1997 |
| WO | WO 98 02809 A | 1/1998 |

OTHER PUBLICATIONS

A. Wollrath, et al, Simple Activation for Distributed Objects, Sun Microsystems Laboratories, 1995, pp. 1–17.*
R. Limprecht, "Microsoft Transaction Server", IEEE, pp. 14–18, Feb. 1997.*
G. Eddon, "COM+: The Evolution of Component Services", IEEE on Computer. pp. 104–106, Jul. 1999.*
Object Transaction Services, OMG document 94.6.1, Jun. 1994.*
(No author given) "Transaction Context Objects in Microsoft Transaction Server", MSDN, pp. (2), Jun. 1997.*
D. Chappell, "The Microsoft Transaction Server (MTS)—Transactions Meet Components", white paper, Microsoft.com, Jun. 1997.*

(List continued on next page.)

Primary Examiner—Sue Lao
(74) Attorney, Agent, or Firm—Klarquist Sparkman, LLP

(57) ABSTRACT

A run-time environment implemented as system services and component integration interfaces provides scalable and robust component-based server applications by deactivating server application components between uses by a client program on separate items of work while allowing the client program to retain references to server application components when deactivated. When a server application component is deactivated, a data state of the component and any resources held by the component are released. The run-time environment activates a component on receiving a call by the client to the component while the component is deactivated, whereupon the component is instantiated with an initial data state. The client can interact with the component as if one instance of the component were in continuous existence from the time the client requests creation of the component until the client finally releases the component reference, whereas in actuality the client accesses a sequence or stream of instances using the component reference through multiple iterations of the activation and deactivation cycle.

18 Claims, 9 Drawing Sheets

U.S. PATENT DOCUMENTS

| | | | |
|---|---|---|---|
| 5,301,280 A | | 4/1994 | Schwartz et al. |
| 5,307,490 A | | 4/1994 | Davidson et al. |
| 5,442,791 A | | 8/1995 | Wrabetz et al. |
| 5,455,953 A | | 10/1995 | Russell |
| 5,481,715 A | | 1/1996 | Hamilton et al. |
| 5,511,197 A | | 4/1996 | Hill et al. |
| 5,517,645 A | | 5/1996 | Stutz et al. |
| 5,519,867 A | | 5/1996 | Moeller et al. |
| 5,524,238 A | | 6/1996 | Miller et al. |
| 5,561,797 A | | 10/1996 | Gilles et al. |
| 5,577,251 A | | 11/1996 | Hamilton et al. |
| 5,577,252 A | | 11/1996 | Nelson et al. |
| 5,581,686 A | * | 12/1996 | Koppolu et al. ............ 395/340 |
| 5,581,760 A | * | 12/1996 | Atkinson et al. ........... 395/700 |
| 5,598,562 A | | 1/1997 | Cutler et al. |
| 5,606,719 A | | 2/1997 | Nichols et al. |
| 5,619,710 A | | 4/1997 | Travis, Jr. et al. |
| 5,625,775 A | | 4/1997 | Davis et al. |
| 5,687,370 A | * | 11/1997 | Garst et al. ................. 395/622 |
| 5,689,708 A | | 11/1997 | Regnier et al. |
| 5,706,429 A | | 1/1998 | Lai et al. |
| 5,717,439 A | | 2/1998 | Levine et al. |
| 5,764,897 A | * | 6/1998 | Khalidi .................. 395/200.31 |
| 5,765,174 A | | 6/1998 | Bishop et al. |
| 5,778,365 A | | 7/1998 | Nishiyama |
| 5,781,910 A | | 7/1998 | Gostanian et al. |
| 5,790,789 A | | 8/1998 | Suarez |
| 5,794,038 A | * | 8/1998 | Stutz et al. ................. 395/700 |
| 5,802,291 A | * | 9/1998 | Balick et al. .......... 395/200.32 |
| 5,815,665 A | | 9/1998 | Teper et al. |
| 5,822,435 A | | 10/1998 | Boebert et al. |
| 5,822,585 A | | 10/1998 | Noble et al. |
| 5,832,274 A | | 11/1998 | Cutler et al. |
| 5,838,916 A | | 11/1998 | Domenikos et al. |
| 5,857,197 A | | 1/1999 | Mullins |
| 5,857,201 A | | 1/1999 | Wright, Jr. et al. |
| 5,864,669 A | | 1/1999 | Osterman et al. |
| 5,864,683 A | | 1/1999 | Boebert et al. |
| 5,875,291 A | | 2/1999 | Fox |
| 5,881,225 A | | 3/1999 | Worth |
| 5,884,316 A | | 3/1999 | Bernstein et al. |
| 5,884,327 A | | 3/1999 | Cotner et al. |
| 5,889,942 A | | 3/1999 | Orenshteyn |
| 5,889,957 A | * | 3/1999 | Ratner et al. .......... 395/200.57 |
| 5,907,675 A | | 5/1999 | Aahlad |
| 5,933,593 A | | 8/1999 | Arun et al. |
| 5,941,947 A | | 8/1999 | Brown et al. |
| 5,958,004 A | * | 9/1999 | Helland et al. ............. 709/101 |
| 5,958,010 A | | 9/1999 | Agarwal et al. |
| 6,026,428 A | * | 2/2000 | Hutchison et al. .......... 709/108 |
| 6,061,796 A | | 5/2000 | Chen et al. |
| 6,105,147 A | | 8/2000 | Molloy |
| 6,161,147 A | | 12/2000 | Snyder et al. |
| 6,223,227 B1 | * | 4/2001 | Williamson et al. ........ 709/315 |

OTHER PUBLICATIONS

"Java Remote Method Invocation Specification," *Java Development Kit (JDK)*, v.1.1, Sun Microsystems, Inc. (1996, 1997).

"Implementing Locale As Dynamically Loaded Shared Object Files", ibm Technical Disclosure Bulletin, US, IBM Corp., New York, vol. 34, No. 12, pp. 117–118 XP000308454 ISSN: 0018–8689—the whole document.

Tripathi, A.R. et al.: "Design Of A Remote Procedure Call System For Object–Oriented Distributed Programming", Software Practice & Experience, GB, John Wiley & Sons Ltd., Chichester, vol. 28, No. 1, pp. 23–47 XP000723715, ISSN: 0038–0644—the whole document.

Thacker et al., "Firefly: A Multiprocessor Workstation," SRC Research Report, pp. 1–17 (Dec. 1987).

Nance, "Balance the Load with Transaction Server," BYTE Magazine, pp. 1–8 (Jun. 1997).

Schroeder et al., "Performance of Firefly RPC," pp. 1–15 (Apr. 1989).

Deitel and Associates, "Classes and Data Abstraction," C++ How to Program, Chapter 6, pp. 344–356, (1994).

Cornell et al., "Objects and Classes," Core Java, 2nd Edition, The Sunset Press Java Series, Ch. 4, pp. 93–139 (1997).

Brockschmidt, "Inside OLE," (second edition), Chapter 1, "An Overview of OLE," pp. 3–60, and Part I: pp. 248–251 (1995).

Orfali et al., "RPC, Messaging, and Peer–to–Peer," Essential Client/Server Survival Guide chapter 9, pp. 119–128 (1994).

Brockschmidt, "Chapter 6 Local/Remote Transparency," Inside Ole, 2d Ed., pp. 277–338 (1995).

Orfali et al., ["COM:OLE's Object Bus"], The Essential Distributed Objects Survival Guide, Ch. 25, pp. 429–452 (© 1996).

Hamilton (Ed.), "JavaBeans™," Sun Microsystems, Version 1.01, pp. 1–114. (Jul. 24, 1997).

"The Component Object Model: Technical Overview," Microsoft Corporation, pp. 1–17.

Grimes, Chapter 7: Security, DCOM Programming: A guide to creating practical applications with Microsoft's Distributed Component Object Model, pp. 319–389 (1997).

Sessions, COM and DCOM:Microsoft's Vision for Distributed Objects, Chapter 6, "Sharing and Scalability," pp. 249–313.

DCOM Architecture, by Markus Horstmann and Mary Kirtland, pp. 1–51, Jul. 23, 1997.

Franklin, "Concurrency Control and Recovery," *The Computer Science and Engineering Handbook*, pp. 1058–1077 (Dec. 1996).

Adams et al., "Pointer and Run–time Allocation," *C++ An Introduction to Computing*, chapter 15, pp. 860–869 (1995).

Brockschmidt, "Inside OLE," (second edition), chapter 5, pp. 219–276 and chapter 22, pp. 1011–1063 (1995).

J. Steinman. "Incremental State Saving in Speedes Using C++," IEEE, pp. 687–696 (1993).

D. Breuce, "The Treatment of State in Optimistic Systems", IEEE, pp. 40–49 (Jun. 1995).

OMG, The Common Object Request Broker: Architecture and Specification, revision 2.0, chapter 2; chapter 4, pp. 12–16 (Jul. 1995).

* cited by examiner

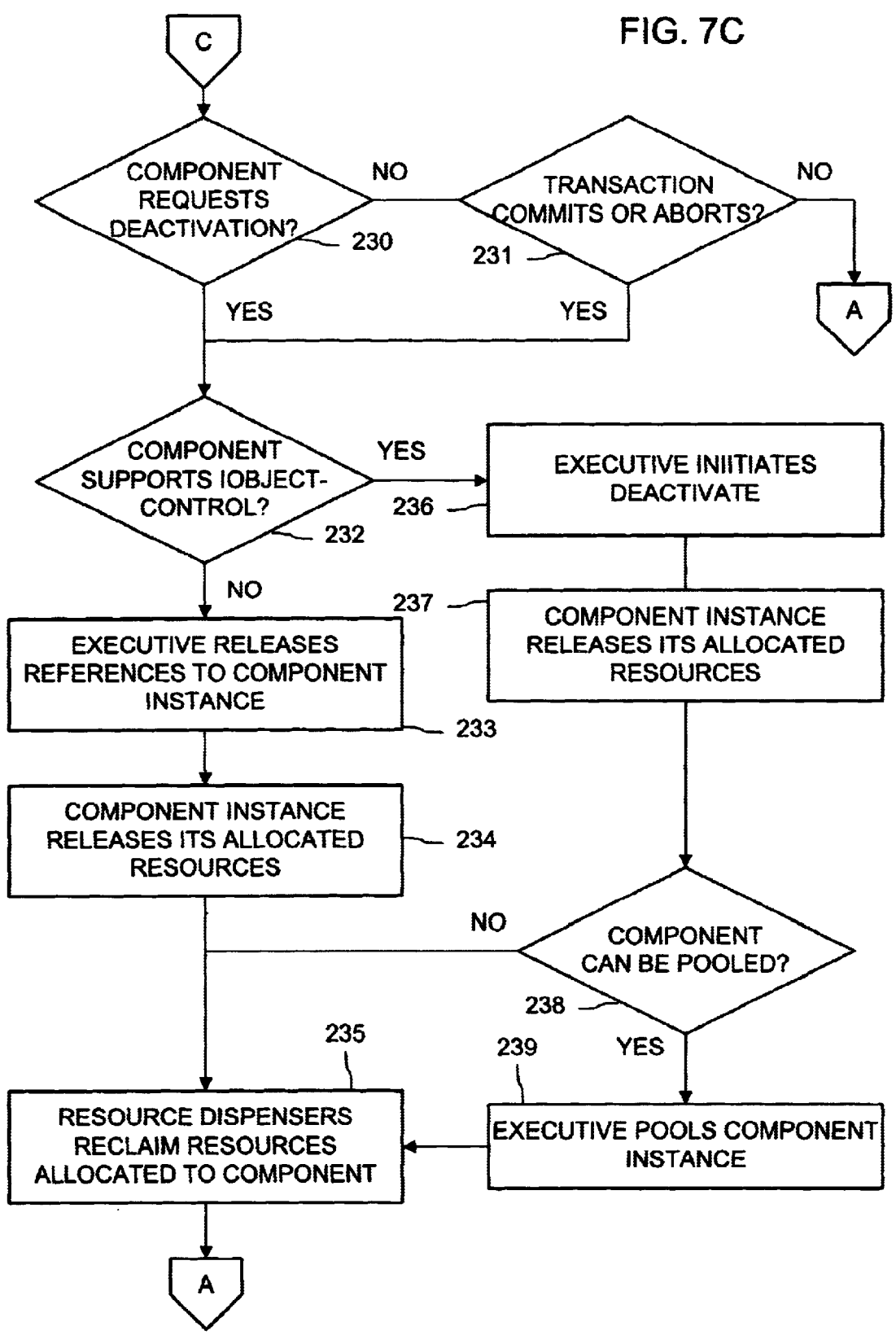

JUST-IN-TIME ACTIVATION AND AS-SOON-AS-POSSIBLE DEACTIVATION OR SERVER APPLICATION COMPONENTS

FIELD OF THE INVENTION

The present invention relates to a server application programming model using software components, and more particularly relates to enhancing scalability of server applications programmed as software components.

BACKGROUND AND SUMMARY OF THE INVENTION

In many information processing applications, a server application running on a host or server computer in a distributed network provides processing services or functions for client applications running on terminal or workstation computers of the network which are operated by a multitude of users. Common examples of such server applications include software for processing class registrations at a university, travel reservations, money transfers and other services at a bank, and sales at a business. In these examples, the processing services provided by the server application may update databases of class schedules, hotel reservations, account balances, order shipments, payments, or inventory for actions initiated by the individual users at their respective stations.

An important consideration in many of these server applications is the ability to handle heavy processing loads. In the above server application examples, for instance, the updates for a large number of users may be submitted to the server application within a short time period. As each update may consume significant processing time, each additional user of the server application can slow the response or time to complete updates for all other users' updates, thus reducing the quality of service for all users. Eventually, the load may exceed the processing capacity, possibly resulting in system failure, down time, and lost data. The degree to which a server application can support incremental increases in user load while preserving performance is sometimes referred to as scalability.

One factor that affects server application scalability is the server application's use of memory to store user data while performing processing for that user. The server computer's memory is a limited resource that is shared among all the users of the server application. Because server computer memory is a shared fixed resource, the duration that the server application stores one user's data affects the availability of the memory to store other users' data. By minimizing the duration that data is stored in the server computer memory for each user, the server application is able to support many more clients with a given server computer memory capacity.

One approach to enhancing scalability is for the server application to keep user data in memory only during the course of a single interaction or exchange with a client (e.g., while processing one remote procedure call or message exchange from the client). The server application keeps a current state of each user's data (also referred to as the user's "state") in secondary storage (e.g., hard disk and other large capacity storage devices), and loads the state into the server computer's main memory only as long as necessary to perform a discrete processing operation on the data responsive to the single interaction. After completing processing of the single interaction, the server application again stores the state into secondary memory. This practice effectively shares the scarce main memory resources among the users. Using this practice, the server application can accommodate more users.

Under this "surgical strike" or "get in/get out" style of programming, the server application generally consisted of a group of functions or procedures that could be called remotely by client applications at the user's workstations to perform the discrete processing operations in a single interaction between the client and server application. In general, the user's state was loaded into main memory at the start of the function, and stored away at the function's completion. Also, the function's parameter list would contain all input data from the client application that was needed for the processing operation. This would sometimes lead to server application functions with extensive parameter lists. For example, a simple function in a banking server application for a money transfer might include parameters for the amount to be transferred, the account number to debit, the account number to credit, the authorization number, the check number, the teller id, the branch id, etc.

Programming models generally known as object-oriented programming provide many benefits that have been shown to increase programmers' productivity, but are in many ways antithetical to the just discussed approach to enhancing scalability. In object-oriented programming, programs are written as a collection of object classes which each model real world or abstract items by combining data to represent the item's properties with functions to represent the item's functionality. More specifically, an object is an instance of a programmer-defined type referred to as a class, which exhibits the characteristics of data encapsulation, polymorphism and inheritance. Data encapsulation refers to the combining of data (also referred to as properties of an object) with methods that operate on the data (also referred to as member functions of an object) into a unitary software component (i.e., the object), such that the object hides its internal composition, structure and operation and exposes its functionality to client programs that utilize the object only through one or more interfaces. An interface of the object is a group of semantically related member functions of the object. In other words, the client programs do not access the object's data directly, but must instead call functions on the object's interfaces to operate on the data.

Polymorphism refers to the ability to view (i.e., interact with) two similar objects through a common interface, thereby eliminating the need to differentiate between two objects. Inheritance refers to the derivation of different classes of objects from a base class, where the derived classes inherit the properties and characteristics of the base class.

Object-oriented programming generally has advantages in ease of programming, extensibility, reuse of code, and integration of software from different vendors and (in some object-oriented programming models) across programming languages. However, object-oriented programming techniques generally are antithetical to the above-discussed approach to enhancing server application scalability by minimizing the duration of state to single client/server application interactions. In object-oriented programming, the client program accesses an object by obtaining a pointer or reference to an instance of the object in memory. The client program retains this object reference throughout the course of its interaction with the object, which allows the client program to call member functions on the object. So long as any client programs have a reference to an object's instance, data associated with the instance is maintained in memory to avoid the client issuing a call to an invalid memory reference. At the very least, even where the client program calls only a single member function, the object instance is kept in memory between the client program's initial call to request a reference to the object instance and the client program's call to release the reference (between which the client program issues one or more calls to member functions of the object using the reference). In other words, the client program has control over the object's lifetime. The object is kept in memory until the client's reference to the object is released.

Also, object-oriented programming encourages setting an object's properties using separate member functions. For example, a money transfer object may provide a set of member functions that includes a SetDebitAccount( ) function, a SetCreditAccount( ) function, a SetTransferAmount( ) function, etc. that the client program calls to set the object's properties. Finally, the client program may call a TransferMoney( ) function to cause the object to perform the money transfer operation using the accumulated object properties (also referred to as the object's state). Again, while the client program issues these separate calls, the object is maintained in memory. In a server application, this programming style can drastically reduce the server application's scalability.

A further disadvantage of object-oriented programming of server applications is that each separate operation with or use of an object often requires creating a separate instance of the object. This is because the accumulated properties that are set for one operation with an object typically differ from the settings of the properties in another operation. In the above money transfer object example, for instance, separate money transfer operations usually involve different account numbers and transfer amounts. Since the accumulated state of an object is retained, the client program either instantiates a new instance of the object for a subsequent money transfer or carefully resets each property of the previously used object instance to avoid carrying properties set in the previous money transfer over to the subsequent transfer. However, instantiating each object also is expensive in terms of processing time and thus further reduces server application scalability.

The present invention is a component-based framework that provides scalable server applications using object-oriented programming principles. The component-based framework according to the invention supports deactivatable software components that conform to object-oriented programming principles. These components can be deactivated such that the component's state is released from memory (i.e., in the sense that any state associated with an instance of the object is no longer kept in memory, nor written to disk as in a persistent object store) while a client program retains a reference to the component. The framework additionally supports just-in-time activation of the component where the component's initial state is restored into memory upon the client program issuing a call to the component using the reference. This deactivation and just-in-time activation of the component has the advantage of minimizing memory usage by the components in a server application, which promotes scalability.

Deactivation allows reuse of the component by the client program in separate operations. The component is deactivated at the completion of an operation. Later, when the client again issues calls to the component for a subsequent operation, the framework automatically re-activates the component in its initial state. Since the component is restored to its initial state at activation, the client program can safely reuse the component with assurance that properties are not carried over from a previous operation with the component. The client program can continue its use of the component in repeated deactivation and just-in-time activation cycles. In effect, the framework thus provides a sequence or stream of instances of the component which the client program accesses through the retained component reference.

According to one aspect of the invention, the framework initially creates the component in a deactivated state and returns the component reference to the client when access to the component is first requested by the client program. The component is not activated until the client program first uses the component reference in a call to the component. This further reduces the time that the component's state is held in memory.

According to a further aspect of the invention, the component controls when it can be deactivated. The framework provides an application programming interface ("API") with which the component indicates upon return from a client program's call that the component does not need to maintain its state after return from the call. On receiving this indication, the framework and component release any resources currently held by the component so that the resources may be reclaimed for other uses. This allows the framework to deactivate the component on an as-soon-as-possible basis, such as at the completion of an operation after which the component's state (e.g., accumulated property settings) need not be retained.

In another aspect of the invention, the framework deactivates and activates the component in connection with transaction processing. Transaction processing is a well known technique for processing a collection of actions (referred to as a "transaction") as a single indivisible unit of work in accordance with the properties of atomicity, consistency, isolation, and durability (referred to as the "ACID" properties). (See, inter alia, Orfali, Robert et al., *Essential Client/Server Survival Guide*, pp. 241–260, John Wiley & Sons, Inc., 1994.) First, when the component completes its participation in a transaction, the component calls framework-provided application programming interface ("API"), such as a SetComplete( ) or SetAbort( ) function, to notify the framework that the component's work on the transaction is successfully completed or must be aborted, and further that the component's state can be released. In response, the framework can deactivate the component. Additionally, components participating in a transaction are automatically deactivated when the transaction commits or aborts. Again, this helps to free server memory and other server resources used by the component as soon as possible after the component completes its work in a transaction. Since instance state accumulated during the transaction is released, this also helps to maintain isolation of the transaction.

In yet another aspect of the invention, the framework recycles component instances to increase the efficiency of activation and deactivation. On deactivating a component instance, the framework may place the deactivated component instance into an instance pool. When activating a component, the framework uses an instance of the component from the pool if one is available. In those circumstances where an instance can be recycled from the pool, the framework saves the processing effort of creating a new instance of the component. On reactivation from the pool, the recycled component instance is returned to its initial activation state.

Additional features and advantages of the invention will be made apparent from the following detailed description of an illustrated embodiment which proceeds with reference to the accompanying drawings.

BRIEF DESCRIPTION OF THE DRAWINGS

FIGS. 7A–7D are a flow chart of a component deactivation and just-in-time activation method performed by the server executive in the execution environment of FIG. 2.

DETAILED DESCRIPTION OF THE ILLUSTRATED EMBODIMENTS

The present invention is directed toward a method and system for scalable server applications using just-in-time activation of deactivatable components. In one embodiment illustrated herein, the invention is incorporated into an application server execution environment or platform, entitled "Microsoft Transaction Server," marketed by Microsoft Corporation of Redmond, Wash. Briefly described, this software provides a run-time environment and services to support component-based server applications in a distributed network.

Exemplary Operating Environment

Figure 1:
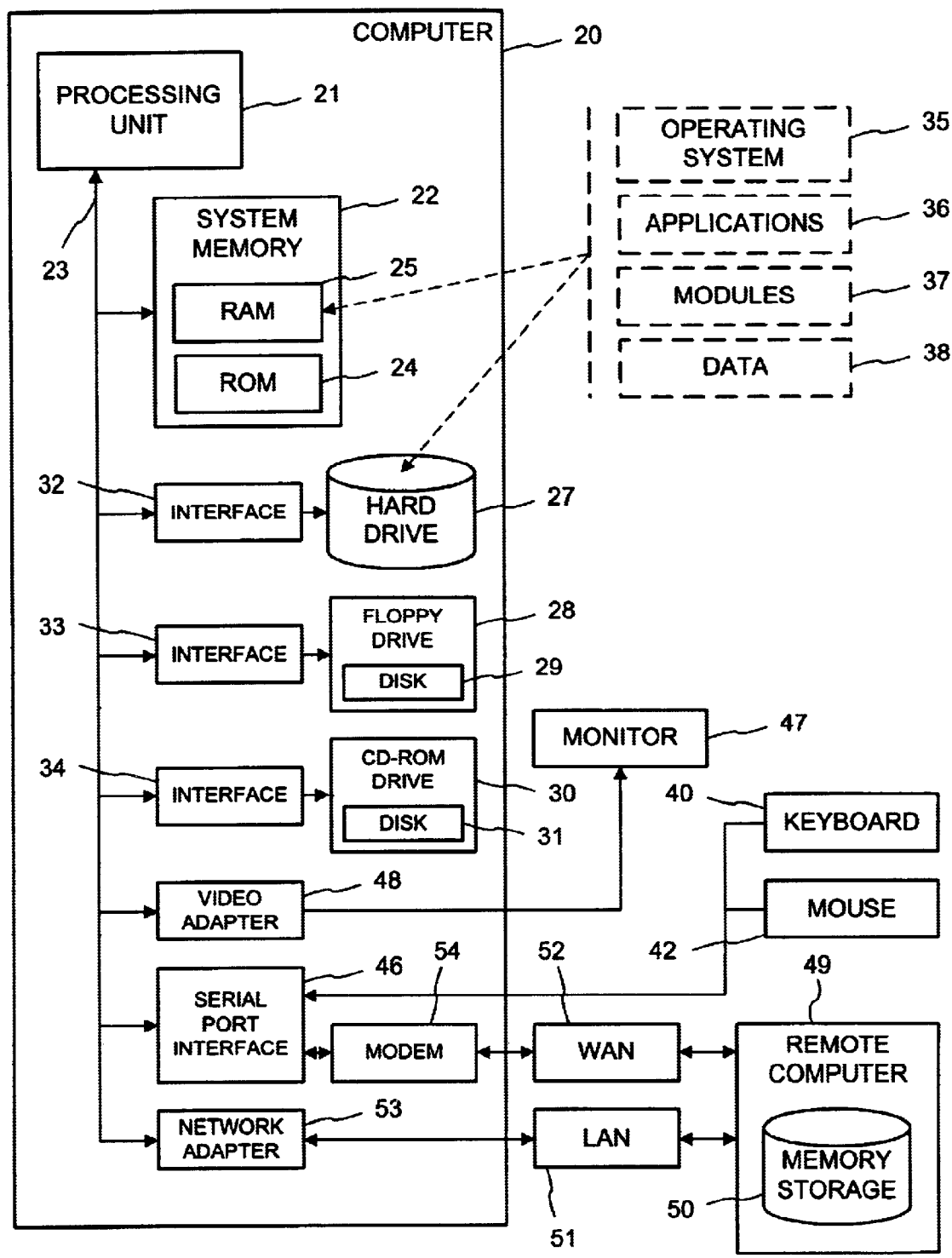
FIG. 1 is a block diagram of a distributed computer system that may be used to implement a method and apparatus embodying the invention for scalable, component-based server applications.

FIG. 1 and the following discussion are intended to provide a brief, general description of a suitable computing environment in which the invention may be implemented. While the invention will be described in the general context of computer-executable instructions of a computer program that runs on a server computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including single- or multiprocessor computer systems, minicomputers, mainframe computers, as well as personal computers, hand-held computing devices, microprocessor-based or programmable consumer electronics, and the like. The illustrated embodiment of the invention also is practiced in distributed computing environments where tasks are performed by remote processing devices that are linked through a communications network. But, some embodiments of the invention can be practiced on stand-alone computers. In a distributed computing environment, program modules may be located in both local and remote memory storage devices.

With reference to FIG. 1, an exemplary system for implementing the invention includes a conventional server computer 20, including a processing unit 21, a system memory 22, and a system bus 23 that couples various system components including the system memory to the processing unit 21. The processing unit may be any of various commercially available processors, including Intel x86, Pentium and compatible microprocessors from Intel and others, including Cyrix, AMD and Nexgen; Alpha from Digital; MIPS from MIPS Technology, NEC, IDT, Siemens, and others; and the PowerPC from IBM and Motorola. Dual microprocessors and other multi-processor architectures also can be used as the processing unit 21.

The system bus may be any of several types of bus structure including a memory bus or memory controller, a peripheral bus, and a local bus using any of a variety of conventional bus architectures such as PCI, VESA, Microchannel, ISA and EISA, to name a few. The system memory includes read only memory (ROM) 24 and random access memory (RAM) 25. A basic input/output system (BIOS), containing the basic routines that help to transfer information between elements within the server computer 20, such as during start-up, is stored in ROM 24.

The server computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage of data, data structures, computer-executable instructions, etc. for the server computer 20. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more application programs 36, other program modules 37, and program data 38. The operating system 35 in the illustrated server computer is the Microsoft Windows NT Server operating system, together with the before mentioned Microsoft Transaction Server.

A user may enter commands and information into the server computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, server computers typically include other peripheral output devices (not shown), such as speakers and printers.

The server computer 20 may operate in a networked environment using logical connections to one or more remote computers, such as a remote client computer 49. The remote computer 49 may be a workstation, a server computer, a router, a peer device or other common network node, and typically includes many or all of the elements described relative to the server computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the server computer 20 is connected to the local network 51 through a network interface or adapter 53. When used in a WAN networking environment, the server computer 20 typically includes a modem 54, or is connected to a communications server on the LAN, or has other means for establishing communications over the wide area network 52, such as the Internet. The modem 54, which may be internal or external, is connected to the system bus 23 via the serial port interface 46. In a networked environment, program modules depicted relative to the server computer 20, or portions thereof, may be stored in the remote memory storage device. It will be appreciated that the network connections shown are exemplary and other means of establishing a communications link between the computers may be used.

In accordance with the practices of persons skilled in the art of computer programming, the present invention is described below with reference to acts and symbolic representations of operations that are performed by the server computer 20, unless indicated otherwise. Such acts and operations are sometimes referred to as being computer-executed. It will be appreciated that the acts and symbolically represented operations include the manipulation by the processing unit 21 of electrical signals representing data bits which causes a resulting transformation or reduction of the electrical signal representation, and the maintenance of data bits at memory locations in the memory system (including the system memory 22, hard drive 27, floppy disks 29, and CD-ROM 31) to thereby reconfigure or otherwise alter the computer system's operation, as well as other processing of signals. The memory locations where data bits are maintained are physical locations that have particular electrical, magnetic, or optical properties corresponding to the data bits.

Server Application Execution Environment

Figure 2:
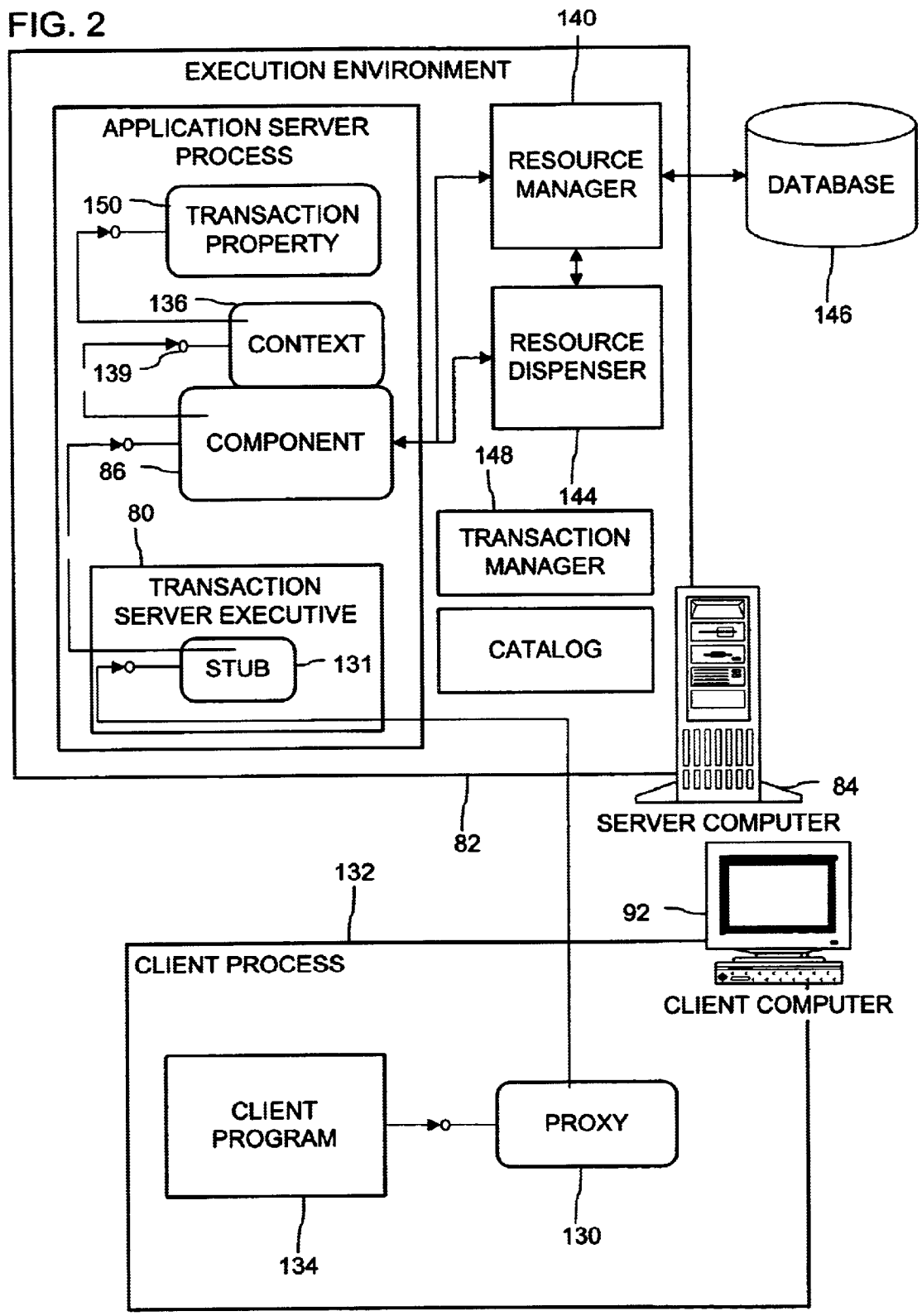
FIG. 2 is a block diagram of a server application component execution environment provided by a server executive on a server computer in the distributed computer system of FIG. 1.

With reference now to FIG. 2, a transaction server executive 80 provides run-time or system services to create a run-time execution environment 80 that supports just-in-time activation of server application components (e.g., server application component 86) on a server computer 84. The transaction server executive also provides services for thread and context management to the server application components 86. Included in the services are a set of API functions, including a GetObjectContext and a SafeRef API functions described below.

The illustrated transaction server executive 80 is implemented as a dynamic link library ("DLL"). (A DLL is a well-known executable file format which allows dynamic or run-time linking of executable code into an application program's process.) The transaction server executive 80 is loaded directly into application server processes (e.g., "ASP" 90) that host server application components, and runs transparently in the background of these processes.

The illustrated ASP 90 is a system process that hosts execution of server application components. Each ASP 90 can host multiple server application components that are grouped into a collection called a "package." Also, multiple ASPs 90 can execute on the server computer under a multi-threaded, multi-tasking operating system (e.g., Microsoft Windows NT in the illustrated embodiment). Each ASP 90 provides a separate trust boundary and fault isolation domain for the server application components. In other words, when run in separate ASPs, a fault by one server application component which causes its ASP to terminate generally does not affect the server application components in another ASP. In the illustrated embodiment, server application components are grouped as a package to be run together in one ASP 90 using an administration utility called "the Transaction Server Explorer." This utility provides a graphical user interface for managing attributes associated with server application components, including grouping the components into packages.

In a typical installation shown in FIG. 2, the execution environment 80 is on the server computer 84 (which may be an example of the computer 20 described above) that is connected in a distributed computer network comprising a large number of client computers 92 which access the server application components in the execution environment. Alternatively, the execution environment 80 may reside on a single computer and host server application components accessed by client processes also resident on that computer.

Server Application Components

The server application components 86 that are hosted in the execution environment 80 of the ASP 90 implement the business logic of a server application, such as the code to manage class registrations in a university's registration application or orders in an on-line sales application. Typically, each server application comprises multiple components, each of which contains program code for a portion of the application's work. For example, a banking application may comprise a transfer component, a debit account component, and a credit account component which perform parts of the work of a money transfer operation in the application.

Figure 3:
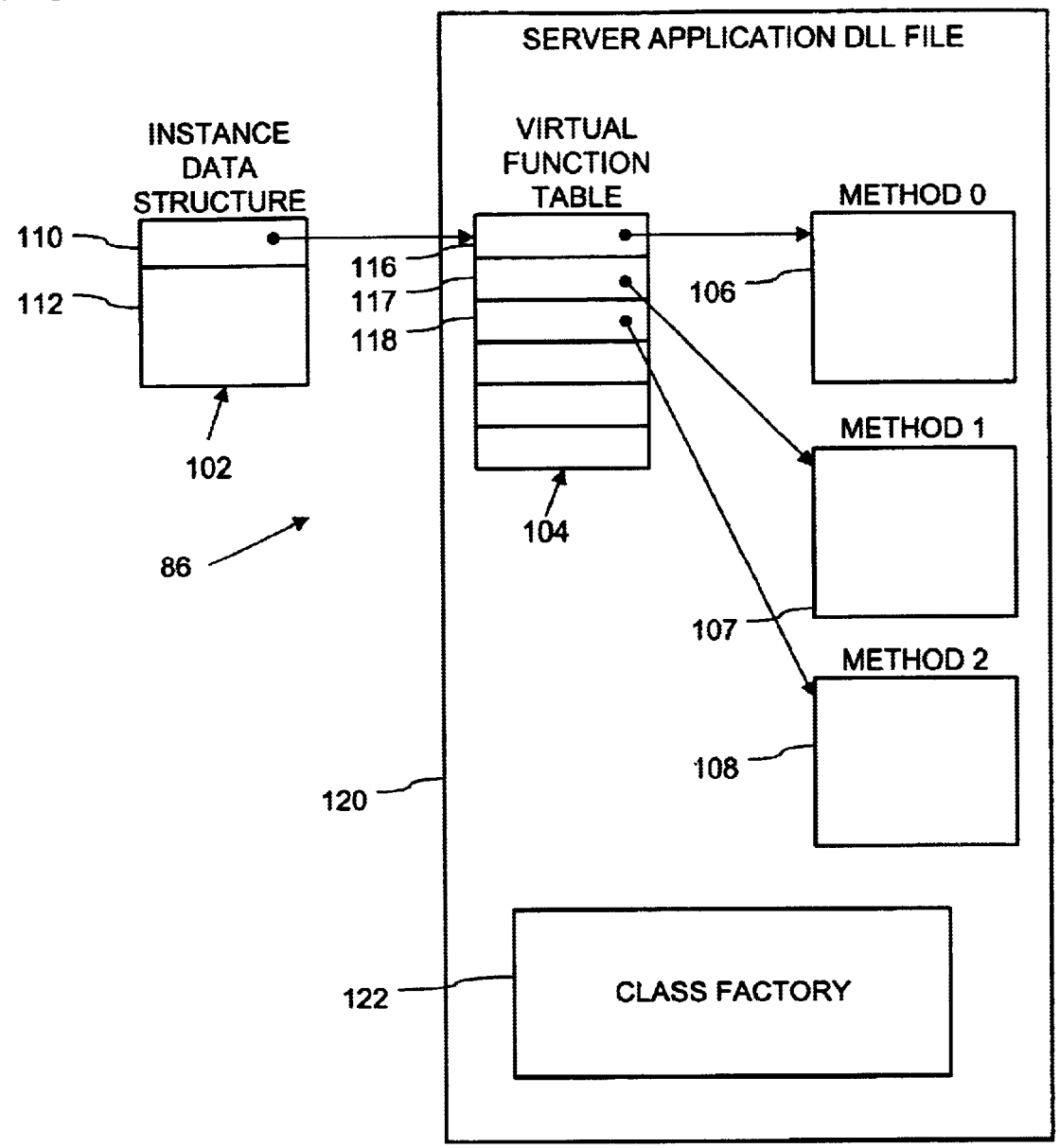
FIG. 3 is a block diagram of the structure of a server application component in the execution environment of FIG. 2.

With reference now to FIG. 3, the server application component 86 (FIG. 2) in the illustrated embodiment conforms to the Component Object Model ("COM") of Microsoft Corporation's OLE and ActiveX specifications (i.e., is implemented as a "COM Object"), but alternatively may be implemented according to other object standards including the CORBA (Common Object Request Broker Architecture) specification of the Object Management Group. OLE's COM specification defines binary standards for components and their interfaces which facilitate the integration of software components. For a detailed discussion of OLE, see Kraig Brockschmidt, *Inside OLE, Second Edition*, Microsoft Press, Redmond, Wash., 1995.

In accordance with COM, the server application component 86 is represented in the computer system 20 (FIG. 1) by an instance data structure 102, a virtual function table 104, and member functions 106–108. The instance data structure 102 contains a pointer 110 to the virtual function table 104 and data 112 (also referred to as data members, or properties of the component). A pointer is a data value that holds the address of an item in memory. The virtual function table 104 contains entries 116–118 for the member functions 106–108. Each of the entries 116–118 contains a reference to the code 106–108 that implements the corresponding member function.

The pointer 110, the virtual function table 104, and the member functions 106–108 implement an interface of the server application component 86. By convention, the interfaces of a COM object are illustrated graphically as a plug-in jack as shown for the server application component 100 in FIG. 3. Also, Interfaces conventionally are given names beginning with a capital "I." In accordance with COM, the server application component 86 can include multiple interfaces which are implemented with one or more virtual function tables. The member function of an interface is denoted as "IInterfaceName::FunctionName."

The virtual function table 104 and member functions 106–108 of the server application component 86 are provided by a server application program 120 (hereafter "server application DLL") which is stored in the server computer 84 (FIG. 2) as a dynamic link library file (denoted with a ".dll" file name extension). In accordance with COM, the server application DLL 120 includes code for the virtual function table 104 (FIG. 3) and member functions 106–108 (FIG. 3) of the classes that it supports, and also includes a class factory 122 that generates the instance data structure 102 (FIG. 3) for a component of the class.

Like any COM object, the sever application component can maintain internal state (i.e., its instance data structure 102 including data members 112) across multiple interactions with a client (i.e., multiple client program calls to member fuinctions of the component). The server application component that has this behavior is said to be "stateful." The server application component can also be "stateless," which means the component does not hold any intermediate state while waiting for the next call from a client.

In the execution environment 80 of FIG. 2, the server application component 86 is executed under control of the transaction server executive 80 in the ASP 90. The transaction server executive 80 is responsible for loading the server application DLL 300 into the ASP 90 and instantiating the server application component 86 using the class factory 122 during activation of the component as described in more detail below. The transaction server executive 80 further manages calls to the server application component 86 from client programs (whether resident on the same computer or over a network connection).

The illustrated execution environment 80 imposes certain additional requirements on the server application component 86 beyond conforming with COM requirements. First, the server application component is implemented in a DLL file (i.e., the server application DLL 120 of FIG. 3). (COM objects otherwise alternatively can be implemented in an executable (".exe") file.) Second, the component's DLL file 120 has a standard class factory 122 (i.e., the DLL implements and exports the DllGetClassObject function, and supports the IClassFactory interface). Third, the server application component exports only interfaces that can be standard marshaled, meaning the component's interfaces are either described by a type library or have a proxy-stub DLL. The proxy-stub DLL provides a proxy component 130 in a client process 132 on the client computer 92, and a stub component 131 in the ASP 90 on the server computer 84. The proxy component 130 and stub component 131 marshal calls from a client program 134 across to the server computer 84. The proxy-stub DLL in the illustrated system is built using the MIDL version 3.00.44 provided with the Microsoft Win32 SDK for Microsoft Windows NT 4.0 with the Oicf compiler switch, and linked with the transaction server executive 80. These additional requirements conform to well known practices.

The client program 134 of the server application component 86 is a program that uses the server application component. The client program can be program code (e.g., an application program, COM Object, etc.) that runs outside the execution environment 80 (out of the control of the transaction server executive 80). Such client programs are referred to as "base clients." Alternatively, the client program 134 can be another server application component that also runs under control of the transaction server executive (either in the same or a separate ASP 90). The client program 134 can reside on the server computer 84 or on a separate client computer 92 as shown in FIG. 2 (in which case the client computer interacts with the server application component 86 remotely through the proxy object 130).

Before the server application component 86 can execute in the illustrated execution environment 80, the server application component 86 is first installed on the server computer 84. As with any COM object, the server application component 86 is installed by storing the server application DLL file 120 that provides the server application component 86 in data storage accessible by the server computer (typically the hard drive 27, shown in FIG. 1, of the server computer), and registering COM attributes (e.g., class identifier, path and name of the server application DLL file 120, etc. as described below) of the server application component in the system registry. The system registry is a configuration database. In addition to the server application component's COM attributes, the server application is registered in the system registry with a "transaction server execution" attribute indicating that the server application component is run under control of the transaction server executive in the illustrated execution environment 80. In the illustrated embodiment, this attribute has the form shown in the following example registry entry.

HKEY_CLASSES_ROOT\CLSID\{AB077646-E902-11D0-B5BE-00C04FB957D8}\LocalServer32=C:\WINNT\System32\mtx.exe/p:{DA16F24B-2E23-11D1-8116-00C04FC2F9C1}

When the server application component 86 is run in the execution environment 80, the transaction server executive 80 maintains a component context object 138 associated with the server application component 86, including while the server application component 86 is deactivated. The component context object 138 provides context for the execution of the server application component 86 in the execution environment 80. The component context object 138 has a lifetime that is coextensive with that of the server application component. The transaction server executive 80 creates the component context object 138 when the server application component 86 is initially created, and destroys the component context object 138 after the application server component 86 is destroyed (i.e., after the last reference to the application server component is released).

The component context object 138 contains intrinsic properties of the server application component that are determined at the component's creation. These properties include a client id, an activity id, and a transaction reference. The client id refers to the client program 134 that initiated creation of the server application component. The activity id refers to an activity that includes the server application component. An activity is a set of components executing on behalf of a base client, within which only a single logical thread of execution is allowed. The transaction reference indicates a transaction property object 150 that represents a transaction in which the server application component participates. The component context object 138 is implemented as a COM Object that runs under control of the transaction server executive. The component context object 138 provides an "IObjectContext" interface described in more detail below, that has member functions called by the server application component 86.

In the illustrated execution environment, the transaction server executive 80 maintains an implicit association of the component context object 138 to the server application component 86. In other words, the transaction server executive 80 does not pass a reference of the component context object 138 to the client program 134 which uses the server application component 86. Rather, the transaction server executive 80 maintains the component's association with the context object, and accesses the component context object when needed during the client program's access to the server application component 86. Thus, the client program 134 is freed from explicitly referencing the component context object 138 while creating and using the server application component 86.

With reference again to FIG. 2, the server computer 84 also runs a resource manager 140 and a resource dispenser 144. The resource manager 140 is a system service that manages durable data (e.g., data in a database 146). The server application component 86 can use the resource manager to maintain the durable state of the server application (such as, the record of inventory on hand, pending orders, and accounts receivable in an on-line sales server application). Examples of resource managers in the illustrated embodiment include the Microsoft SQL Server, durable message queues, and transactional file systems. Preferably, the resource manager 140 supports performing changes or updates by the server application component 86 to the server application's durable state on a transactional basis (i.e., in transactions conforming to the well-known ACID properties).

The resource dispenser 144 is a service that manages non-durable shared state (i.e., without the guarantee of durability) on behalf of the server application components within the ASP 90. Examples of the resource dispenser 144 in the illustrated embodiment include an ODBC resource dispenser that maintains a pool of database connections conforming to the Microsoft Open Database Connectivity ("ODBC") call level interface. The ODBC resource dispenser allocates database connections to the server application component for accessing data from a database 146 (generally, through its resource manager 140). Also, the ODBC resource dispenser reclaims database connections when released by the server application components for later reuse.

The illustrated execution environment 82 further includes a transaction manager 148. The transaction manger 148 is a system service that coordinates transactions that span multiple resource managers, including where the resource managers reside on more than one server computer in a distributed network. The transaction manager 148 ensures that updates across all resources managers involved in a transaction occur in conformance with the ACID properties using the well known two-phase commit protocol, regardless of failures (e.g., computer or network hardware or software failures, or errors caused by a misbehaved resource manager or application), race conditions (e.g., a transaction that starts to commit while one resource manager initiates an abort), or availability (a resource manager prepares a transaction but never returns). The illustrated transaction manager 148 is the Microsoft Distributed Transaction Coordinator (MSDTC) released as part of Microsoft SQL Server 6.5.

Transaction Processing With Server Application Components

The illustrated execution environment 80 also provides support for transaction processing conforming to the ACID properties and using the well known two phase commit protocol. In the illustrated execution environment 80, one or more server application components that participate in a transaction (i.e., an atomic unit of work that is either done in its entirety or not at all) will each have a transaction property object 150 associated with their component context object 136 to represent the transaction. The transaction server executive 80 creates the transaction property object 150 when the transaction is initiated, and associates the transaction property object with the component context object of each server application component in the transaction.

While the server application component 86 is associated with the transaction property object 150, the transaction server executive automatically associates the transaction property object 150 with any other server application object that is created by the server application component 86 or resource that is obtained by the server application component 86. For example, a money transfer operation in an on-line banking server application can be implemented in a "transfer" server application component that creates two "account" server application components to debit and credit the transferred amount to the affected accounts. Thus, when the transfer component creates the account components, the transaction server executive automatically associates the account components with the transfer component's transaction property object so that work of the individual account component in the money transfer is performed as a single atomic action. Also, any resources obtained by the server application component 86 from the resource manager 140 or resource dispenser 144 are associated with the component's transaction property object 150 so that services performed by the resource manager or dispenser on the component's behalf also are encompassed within the transaction. For example, when the server application component 86 allocates a database connection using the ODBC Resource Dispenser while associated in a transaction, the connection is automatically enlisted on the transaction. All database updates using the connection become part of the transaction, and are either atomically committed or aborted.

The server application component 86 can affect the outcome of a transaction using "SetComplete" and "SetAbort" member functions of its component context object's IObjectContext interface. When the server application component 86 has done its portion of the work in a transaction, the component calls either the SetComplete or SetAbort member functions. By calling the SetComplete member function, the server application component 86 indicates its work in the transaction is done satisfactorily. On the other hand, the server application component 86 calls the SetAbort member finction to indicate that its processing in the transaction is done, but the work could not be completed successfully and must be aborted. For example, a debit account component in a server application which updates an account from which money is transferred in a money transfer transaction may call SetComplete when the update leaves a positive balance in the account, but calls SetAbort when the update would leave a negative account balance.

The transaction server executive 80 causes the transaction to complete (i.e., the transaction commits or aborts) when the server application component for which the transaction was initiated (termed the "root" of the transaction) indicates work in the transaction is complete (i.e., with the SetComplete or SetAbort function call). The transaction commits unless any of the components and resources enlisted in the transaction indicates the transaction is not to be committed, such as by calling the SetAbort function. Otherwise, the transaction is aborted.

Overview of COM Object Instantiation in OLE

As with other COM objects, the client program 134 (FIG. 2) must first request creation of an instance of the server application component 86 (FIG. 2) and obtain a reference to the server application component before the client program can access the functionality implemented by the server application component (i.e., before the client program can call member functions supported on an interface of the server application component).

In Microsoft's OLE, a client program instantiates a COM object using services provided by OLE and a set of standard component interfaces defined by COM based on class and interface identifiers assigned to the component's class and interfaces. More specifically, the services are available to client programs as application programming interface (API) functions provided in the COM library, which is part of a component of the Microsoft Windows operating system in a file named "OLE32.DLL." Also in OLE, classes of COM objects are uniquely associated with class identifiers ("CLSIDs"), and registered by their CLSID in a system configuration database referred to as the "registry." The registry entry for a COM object class associates the CLSID of the class with information identifying an executable file that provides the class (e.g., a DLL file having a class factory to produce an instance of the class). Class identifiers are 128-bit globally unique identifiers ("GUID") that the programmer creates with an OLE service named "CoCreateG-UID" (or any of several other APIs and utilities that are used to create universally unique identifiers) and assigns to the respective classes. The interfaces of a component additionally are associated with interface identifiers ("IIDs").

In particular, the COM library provides an API function, "CoCreateInstance," that the client program can call to request creation of a component using its assigned CLSID and an IID of a desired interface. In response, the CoCreateInstance API looks up the registry entry of the requested CLSID in the registry to identify the executable file for the class. The CoCreateInstance API function then loads the class' executable file, and uses the class factory in the executable file to create an instance of the COM object. Finally, the CoCreateInstance API function returns a pointer of the requested interface to the client program. The CoCreateInstance API function can load the executable file either in the client program's process, or into a server process which can be either local or remote (i.e., on the same computer or a remote computer in a distributed computer network) depending on the attributes registered for the COM object in the system registry.

Once the client program has obtained this first interface pointer of the COM object, the client can obtain pointers of other desired interfaces of the component using the interface identifier associated with the desired interface. COM defines several standard interfaces generally supported by COM objects including the IUnknown interface. This interface includes a member function named "QueryInterface." The QueryInterface function can be called with an interface identifier as an argument, and returns a pointer to the interface associated with that interface identifier. The IUnknown interface of each COM object also includes member functions, AddRef and Release, for maintaining a count of client programs holding a reference (such as, an interface pointer) to the COM object. By convention, the IUnknown interface's member functions are included as part of each interface on a COM object. Thus, any interface pointer that the client obtains to an interface of the COM object can be used to call the QueryInterface function.

Creating the Server Application Component

With reference still to FIG. 2, the client program 134 can create the server application component 86 in the illustrated execution environment 80 in any of several ways. First, the client program 134 can create the server application component 86 using the CoCreateInstance API function or an equivalent method based on the CoGetClassObject API function and IClassFactory::CreateInstance function (which are a conventional COM API function and standard COM interface). The CoGetClassObject API function on the server computer 84 returns a reference to a class factory provided in the transaction server executive 80 when the system registry entry for the requested class includes the transaction server execution attribute described above. This allows the transaction server executive to participate in a subsequent call to the IClassFactory::CreateInstance function (such as by the CoCreateInstance API function) since the call is then made to the class factory in the transaction server executive. In response to this call, the implementation of the IClassFactory::CreateInstance function in the transaction server executive's class factory creates the component context object 138 of the server application component 86. The transaction server executive 80 later calls the IClassFactory::CreateInstance function of the class factory 122 in the server application DLL file 120 to create the server application component 86. While this first approach may suffice for many client programs, there are some significant limitations for the client program, including the inability of the client program to control the server application component in a transaction.

Second, the server application component 86 can be created using the component context object of another component. The component context object provides an IObjectContext::CreateInstance member function which can be called to create other server application components that inherit context from the component context object (i.e., the component context objects created for the new components have the same context properties, including client id, activity id and transaction, as the original component context object). For example, where a "transfer" component and two "account" components implement a money transfer operation in an on-line banking server application, the transfer component may create the two account components for the money transfer operation using its component object context. The account components automatically inherit properties from the transfer component's context and are included in the same transaction as the transfer component.

In this second approach, the server application component accesses its omponent context object using a service of the transaction server executive, alled the GetObjectContext API function (described below).

Safe References

When the server application component 86 is created using any of the three above described approaches, the server application component executes in the illustrated execution environment 80 under control of the transaction server executive 80. More specifically, the client program's call to the CoCreateInstance or IObjectContext::CreateInstance functions to initiate creating the server application component returns a reference to the server application component referred to as a "safe reference." References obtained through a call to the server application component's QueryInterface member function (described above) also are safe references. Thus, through use of the QueryInterface function, the client program 134 can obtain multiple safe references to various interfaces supported on the server application component. Also, the client program 134 can pass safe references to other client programs and server application components to allow such other clients to also use the server application component 86.

Instead of being a direct pointer to the server application component's instance data structure 102 (FIG. 3) as are object references in COM, safe references refer indirectly to the server application component through the transaction server executive 80. Thus, calls made to the server application component's member functions using a safe reference always pass through the transaction server executive 80. This allows the transaction server executive to manage context switches, and allows the server application component to have a lifetime that is independent of the client program's reference to the component. The transaction server executive 80 tracks usage of all safe references to the server application component 86 through activation and deactivation, such that all safe references consistently refer to the current instance of the server application component when activated. When deactivated, a call using any safe reference to the server application component causes the transaction server executive to activate the server application component.

So as to ensure that all calls are made to the server application component using a safe reference (i.e., so that the calls pass through the transaction server executive 80), the server application component 86 preferably is programmed to not pass to a client or other object any direct reference to itself outside of a QueryInterface call. Instead, the server application component can obtain a safe reference to itself to provide to clients using a SafeRef API function (described below) of the transaction server executive 80.

Just-In-Time Activation

Figure 4:
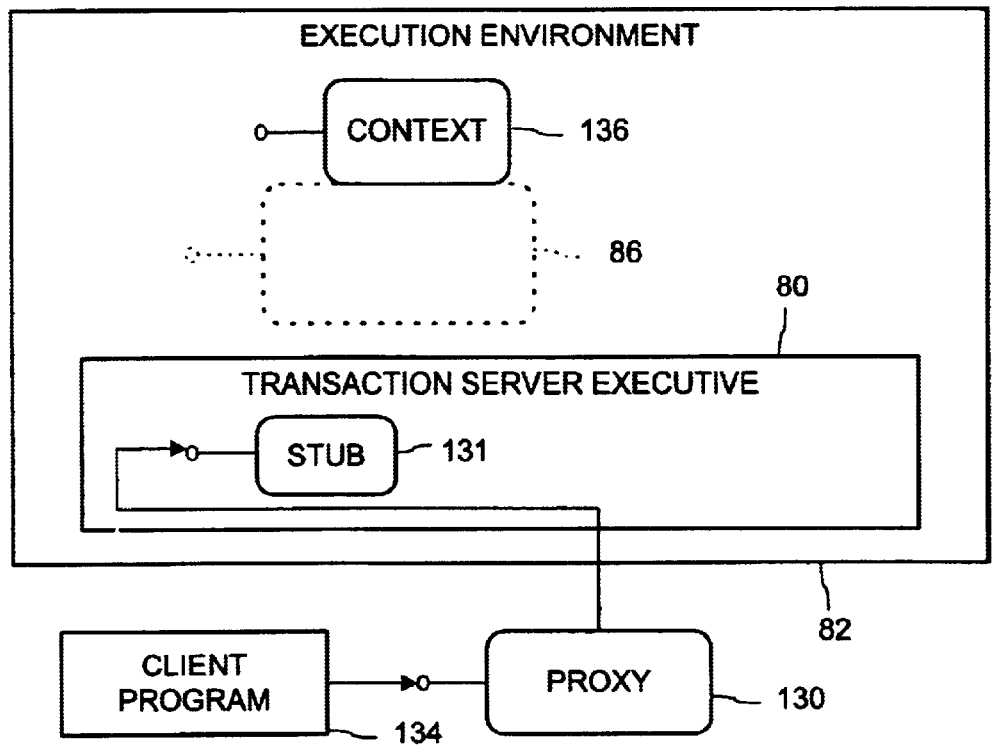
FIG. 4 is a block diagram illustrating the server application component in a deactivated condition in the execution environment of FIG. 2.

With reference now to FIG. 4, the illustrated execution environment 80 maintains the server application component in a deactivated condition until actively used by the client program 134. While deactivated, the client program 134 retains its reference to the server application component 86 indirectly through the transaction server executive 80 (i.e., the safe reference described above). However, the deactivated server application component 86 is not kept instantiated in the memory 22 (FIG. 1) of the server computer 84. More specifically, the instance data structure 102 of the deactivated server application component (which contains the state of the component's interaction with the client program) is not in memory. Further, the server component 86 is first created in the deactivated condition, and not actually instantiated until first used by the client program 134.

Figure 5:
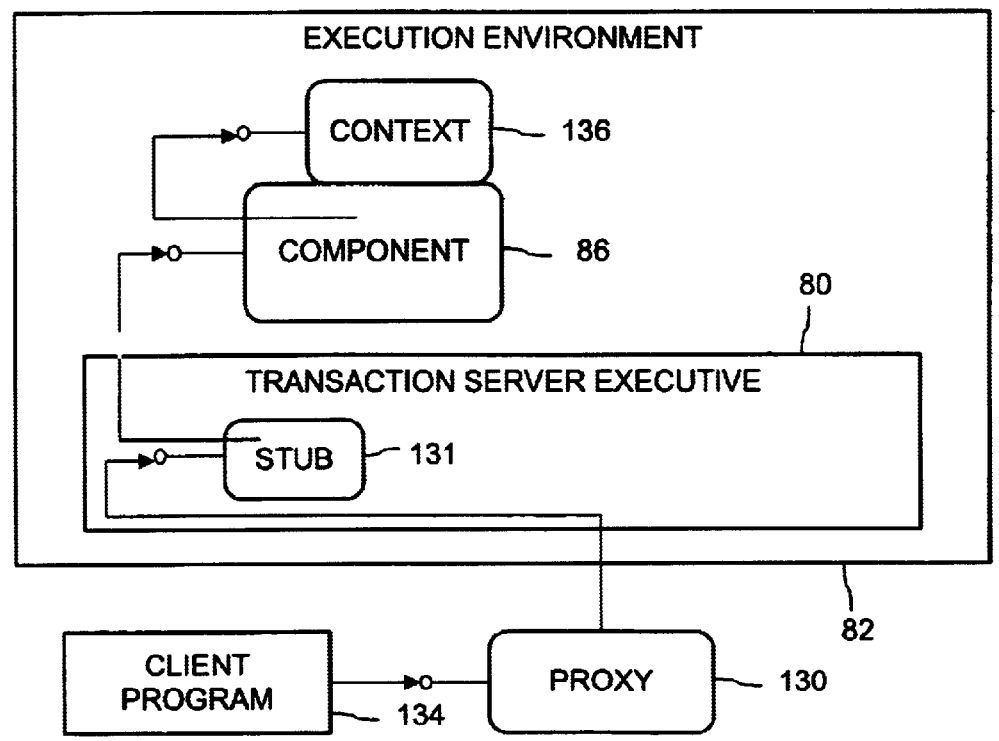
FIG. 5 is a block diagram illustrating the server application component in an activated condition in the execution environment of FIG. 2.

With reference to FIG. 5, any calls made by the client program 134 to the server application component 86 using the safe reference pass through the transaction server executive 80. If the server application component 86 is deactivated at the time that the client program 134 calls a member function of the server application component (other than the standard IUnknown functions, QueryInterface (where the interface is known to the transaction server executive), AddRef, and Release), the transaction server executive 80 instantiates the server application component 86 by calling the IClassFactory::CreateInstance function on the class factory 122 (FIG. 3) of the component's DLL file 120. This results in allocating memory for and constructing the instance data structure 102 of the server application component 86. The server application component is placed in this initial, post-construction state whenever activated, and not just upon its first activation. Then, the transaction server executive 80 passes the client program's call to the appropriate member function of the now instantiated server application component. The transaction server executive 80 thus activates the server application component upon use by the client program 134. This is referred to herein as "just-in-time" activation.

As-Soon-As-Possible Deactivation

With reference still to FIGS. 4 and 5, the transaction server executive 80 again deactivates the server application component 86 at the completion of the component's work, the completion of a transaction, or when the client program 134 releases its reference to the component. More specifically, the transaction server executive deactivates the server application component on the occurrence of any of the following events: the component requests deactivation, the component's transaction is committed or aborted, or all client programs release their reference to the component.

In the illustrated execution environment, the server application component requests deactivation by calling the IObjectContext::SetComplete or IObjectContext::SetAbort functions. The call to either of these functions indicates the component's work in a transaction is done, and the component does not need to maintain its state after returning from the call. This causes the transaction server executive to deactivate the component. The server application component also is immediately deactivated without action of the client program 134 at the end of a transaction in which it participates, such as upon the root component of the transaction calling the SetComplete or SetAbort functions (which initiates an attempt to commit or abort the transaction) or upon events where it is known that the transaction must be aborted (e.g., a resource such as the database 146 participating in the transaction initiates aborting the transaction, a resource manager involved in the transaction fails, the ASP 90 fails, etc.).

Finally, the server application component is permanently deactivated when the last client having a reference to the component releases that reference, such as by calling the IUnknown::Release function of the component. In response, the component is deactivated and the component's component context object also is released. The server application component therefore will not again be just-in-time activated.

When deactivated, the transaction server executive 80 releases its reference to the server application component 86 (which causes the component's reference count to be decremented to zero). In accordance with COM, this causes the server application component (as a COM object) to destroy its instance data structure 102 and release all resources held by the component (such as, by releasing any references to other server application components, COM objects, and database connections and other resources managed by the resource dispenser 144 or resource manager 140 that were used by the component during activation). This results in the state accumulated by the server application component in its instance data structure or other resources held by the component being destroyed.

The deactivation of the server application component on the component's request or on committing or aborting a transaction in which the component is enlisted is herein called "as-soon-as-possible deactivation." This as-soon-as-possible deactivating provides several advantages to server applications implemented using server application components, including increasing the scalability and robustness of the server application. The as-soon-as-possible deactivation provides scalability since the client program can hold references to server application components for long periods of time with only limited consumption of resources at the server computer 84. For example, where the client program 134 spends 99% of its time between transactions, the server application component will be activated less than 1% of the time. While deactivated, the only server resources consumed are those for the component context object 136 (FIG. 4).

The scalability of a server application also can be enhanced outside of a transaction by the server application component requesting deactivation using the SetComplete or SetAbort function calls. For example, a stateless component (one which does not retain state between calls from a client program) can call the SetComplete or SetAbort functions before returning from each client call to the component. This causes the transaction server executive to deactivate the component immediately upon return from the client's call. The stateless component thus remains deactivated between client calls. Further, the component is not left activated and consuming resources on return from the client's call, while awaiting its final release by the client program. This becomes increasingly effective at reducing server resource consumption as the time to communicate between the client and server computer is increased (e.g., in distributed networks with low bandwidth or high latency connections between client and server computers).

The as-soon-as-possible deactivation of the server application component 86 also enforces a style of transaction-based programming that results in more robust server applications. By deactivating the server application component at the completion of its participation in a transaction, the state of the server application component which is accumulated during its work in the transaction is destroyed. When again activated for work in a separate transaction, the server application component is again placed in its initial, post-construction state. This ensures that the component's state, such as its data property settings, is not carried over into any subsequent transactions. Thus, deactivation and activation according to the invention effectively ensures transaction isolation and database consistency.

With just-in-time activation and as-soon-as-possible deactivation according to the invention, the server application component effectively becomes a sequence or stream of instances, referred to herein as an instance stream. The client program can hold a reference to the server application component through multiple activation and deactivation cycles. From the client program's perspective, the execution environment 80 behaves as if only a single instance of the server application component exists from the time the client program requests the component's creation to the time the client program finally releases its reference to the component. In actuality, the execution environment 80 provides an instance of the server application component at each activation, resulting in the instance stream.

Instance Pooling and Recycling

Figure 6:
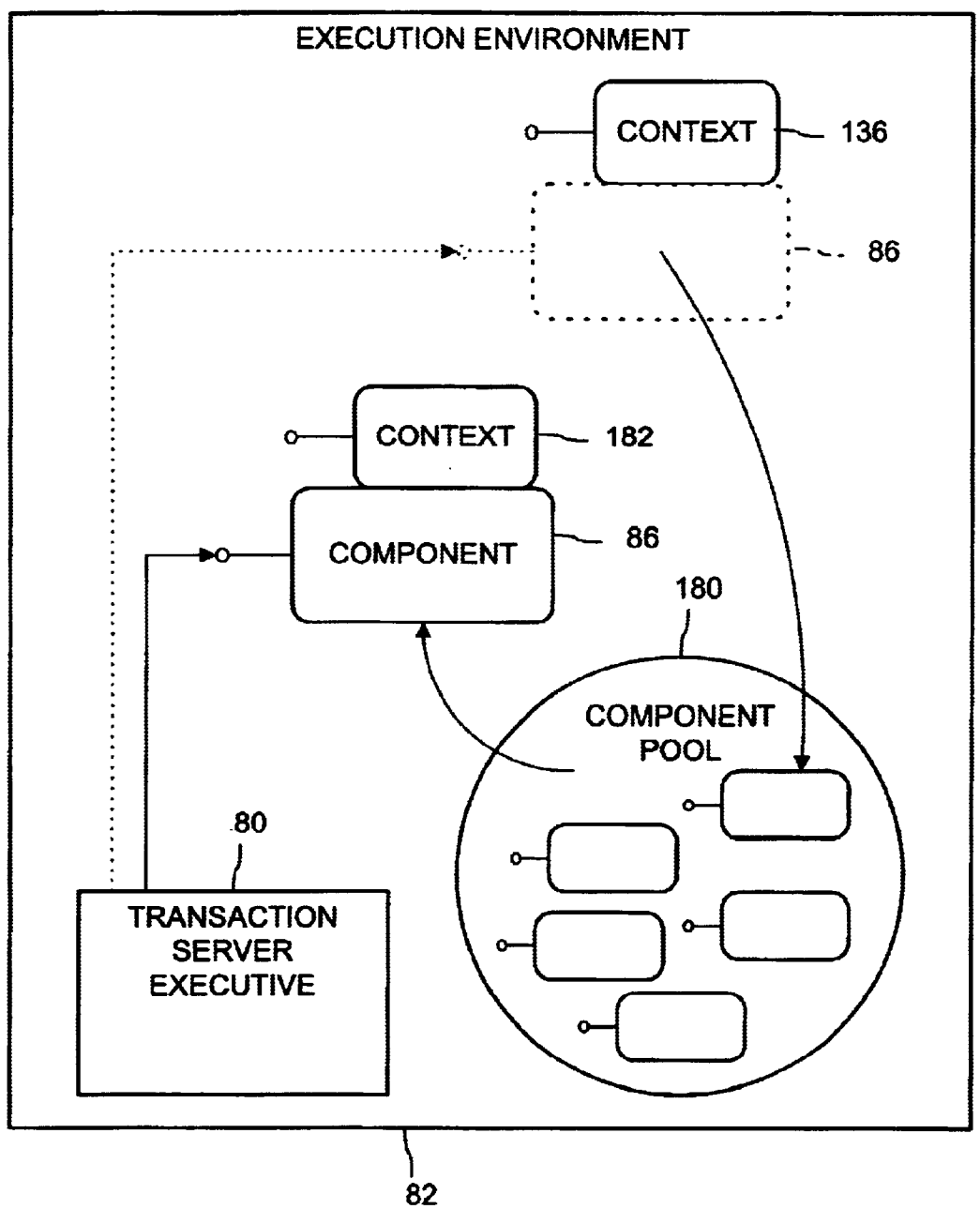
FIG. 6 is a block diagram of a component pool for pooling and recycling server application components by the server executive in the execution environment of FIG. 2.

With reference now to FIG. 6, the illustrated execution environment 80 further enhances server application scalability through pooling and recycling of server application component instances. Instead of releasing the instance of the server application component on deactivation (which causes its destruction), the illustrated transaction server executive may instead place the instance in a component pool 180, such as by adding the transaction server executive's reference to the server application component instance to a list of instances held in the pool. When activating the server application component, the transaction server executive 80 first checks in the component pool 180 for a pooled instance of the component. If an instance of the component is held in the component pool 180, the transaction server executive 80 activates the server application component by recycling the pooled instance rather than creating a new instance of the component using its class factory 122. Since recycling the instance consumes only the time to retrieve a reference to the instance from the pool and creating a new instance of the component requires at least allocating memory for and constructing the instance data structure 102, this pooling and recycling of component instances can save significant time.

Instances in the component pool 180 can be recycled for use in the same instance stream (e.g., for activation of the server application component on a subsequent call to the component using the same reference still held by the client program). The instances also can be recycled by the transaction server executive for use in a different instance streams, including for use by other client programs, than the instance stream in which the instance was used prior to pooling. On recycling the instance during component activation, the instance is returned to its initial, post-construction state which ensures that any state accumulated by the component instance during its use prior to pooling is not carried over.

Instance pooling and recycling in the illustrated embodiment is implemented by the transaction server executive, and additionally by a component interface, IObjectControl, which is implemented by the server application component to support instance pooling and recycling. The IObjectControl interface (described below) has a CanBePooled, an Activate, and a Deactivate member functions. When activating the server application component, the transaction server executive calls QueryInterface to determine that the server application component provides the IObjectControl interface and obtain an interface pointer to the component's IObjectControl interface. The transaction server executive retains the IObjectControl interface pointer for later use, such as at deactivation. At deactivation, the transaction server executive calls the IObjectControl::CanBePooled function. If the component implementation of the function returns true (indicating the component supports instance pooling and recycling), the transaction server executive pools the instance of the server application component. Otherwise, if the component does not provide the IObjectControl interface or its CanBePooled function returns false, the transaction server executive 80 releases the instance (resulting in its destruction) to deactivate the component.

The transaction server executive calls the server application component's Deactivate function on deactivating the component and its Activate function on activation. The component's implementation of these functions include code which ensures that the recycled component instance returns to its initial, post-construction state upon activation. For example, the Deactivate function preferably includes code to release resources then held by the server application component, such as references to other server application components that were created by the instance and resources obtained from the resource manager 140 and resource dispenser 144 (FIG. 2). In this way, the server application component instance does not continue consuming these resources while deactivated and held in the component pool 180. The Activate function, on the other hand, preferably resets the data properties in the instance data structure 102 of the component, and acquires any resources that the component obtains upon creation so as to place the component in its initial, post-construction state.

Component Activation and Deactivation Process

With reference now to FIGS. 7A–7D, the illustrated execution environment 80 (FIG. 2) performs a process 200 for just-in-time activation and as-soon-as-possible deactivation of the server application component 86 (FIGS. 4 and 5) according to the invention.

The illustrated process 200 begins at step 204 with a request to create the server application component 86. As described above, the request may be made by the client program 134 in a call to the CoCreateInstance API function. Alternatively, the request may be made by another server application component (hereafter also referred to as the client program) in a call to the IObjectContext::CreateInstance function of its component context object.

In response to any of these requests, the transaction server executive 80 at step 205 creates the component context object 136 which it implicitly associates with the server application component 86. At step 206, the transaction server executive 80 returns to the client program a safe reference (described above) to the server application component 86. The server application component 86 at this point is deactivated. The server application component 86, in fact, is not yet instantiated.

At some later time (step 207), the client program 134 calls a member function of the server application component 86 using the safe reference obtained from the transaction server executive 80. As indicated at step 208, the transaction server executive determines whether the call is to the QueryInterface, AddRef, or Release functions (hereafter the IUnknown functions) of the server application component. If the client's call is to one of these functions, the transaction server executive 80 can process the call at step 209 without activating the server application component 86.

The transaction server executive processes calls to the AddRef and Release functions at step 209 by incrementing or decrementing, respectively, a count of the number of programs holding the safe reference to the server application component 86. As previously discussed, the client program 134 holds only indirect or safe references through the transaction server executive to the server application component. The transaction server executive 80 maintains a reference count for each safe reference based on the client calls to the AddRef and Release functions. Each AddRef call made using a safe reference causes the transaction server executive 80 to increment the reference count of the safe reference by one. Each call to Release causes the transaction server executive to decrement the reference count by one. The transaction server executive 80 itself holds the direct references to the server application component 86, including the reference returned when an instance of the component is created at activation plus any references to other interfaces on the component that are obtained as a result of a QueryInterface request. When the reference count for a safe reference to a server application component interface is brought to zero as a result of a Release call, the transaction server executive 80 releases its corresponding direct reference to the server application component interface. Otherwise, the transaction server executive's direct references to server application component interfaces are all released when a server application component instance is destroyed upon deactivation.

The transaction server executive processes calls to the QueryInterface function by returning to the client program a safe reference to the interface requested in the QueryInterface call. If the interface already is known to be supported on the server application component (such as from configuration information for the server application component or from a prior direct QueryInterface of the transaction server executive to the server application component), the transaction server executive 80 merely creates a safe reference for the interface and returns the created safe reference to the client program 134 without activating the server application component. (The server application component is not activated until a subsequent call from the client program 134 using the safe reference.) If support by the server application component for the interface is not known, the transaction server executive 80 activates the server application component (as shown in steps 220–225 of FIG. 7B) for the purpose of issuing the QueryInterface to the server application component so as to determine the server application component's support for the interface. If supported, the transaction server executive 80 retains the direct reference to the interface obtained from the server application component. The transaction server executive 80 then creates and returns a safe reference to the requested component interface back to the client program 134. If the requested interface is not supported, the transaction server executive 80 returns a failure to the client program 134 per usual COM semantics.

Otherwise, if the call is to a member function of the server application component 86 other than the IUnknown functions, the transaction server executive 80 checks whether the server application component has been activated at step 210. If so, the transaction server executive 80 passes the call to the server application component 86, such as by initiating processing of the call by the called function as indicated at step 211.

Figure 7A:
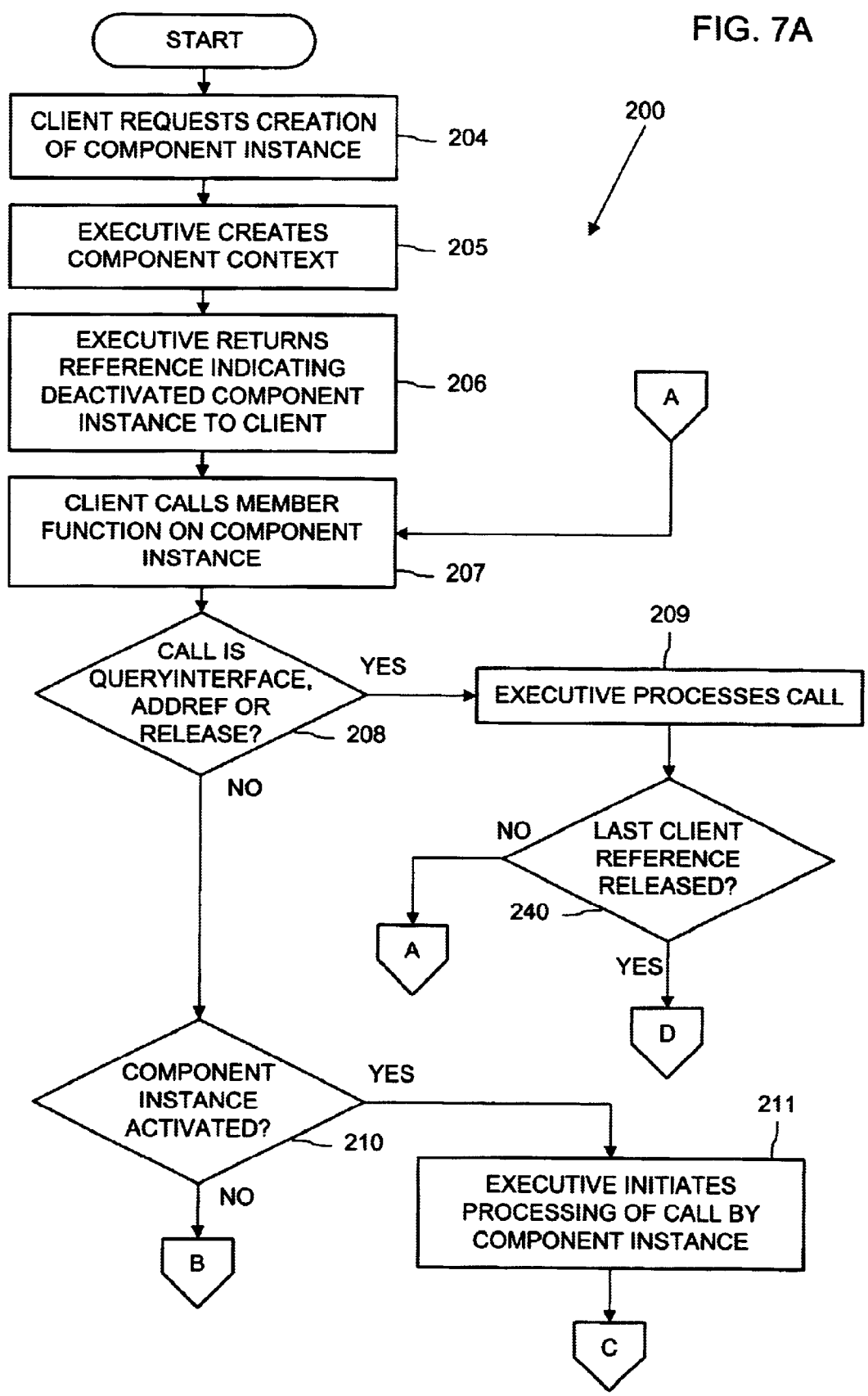
Figure 7B:
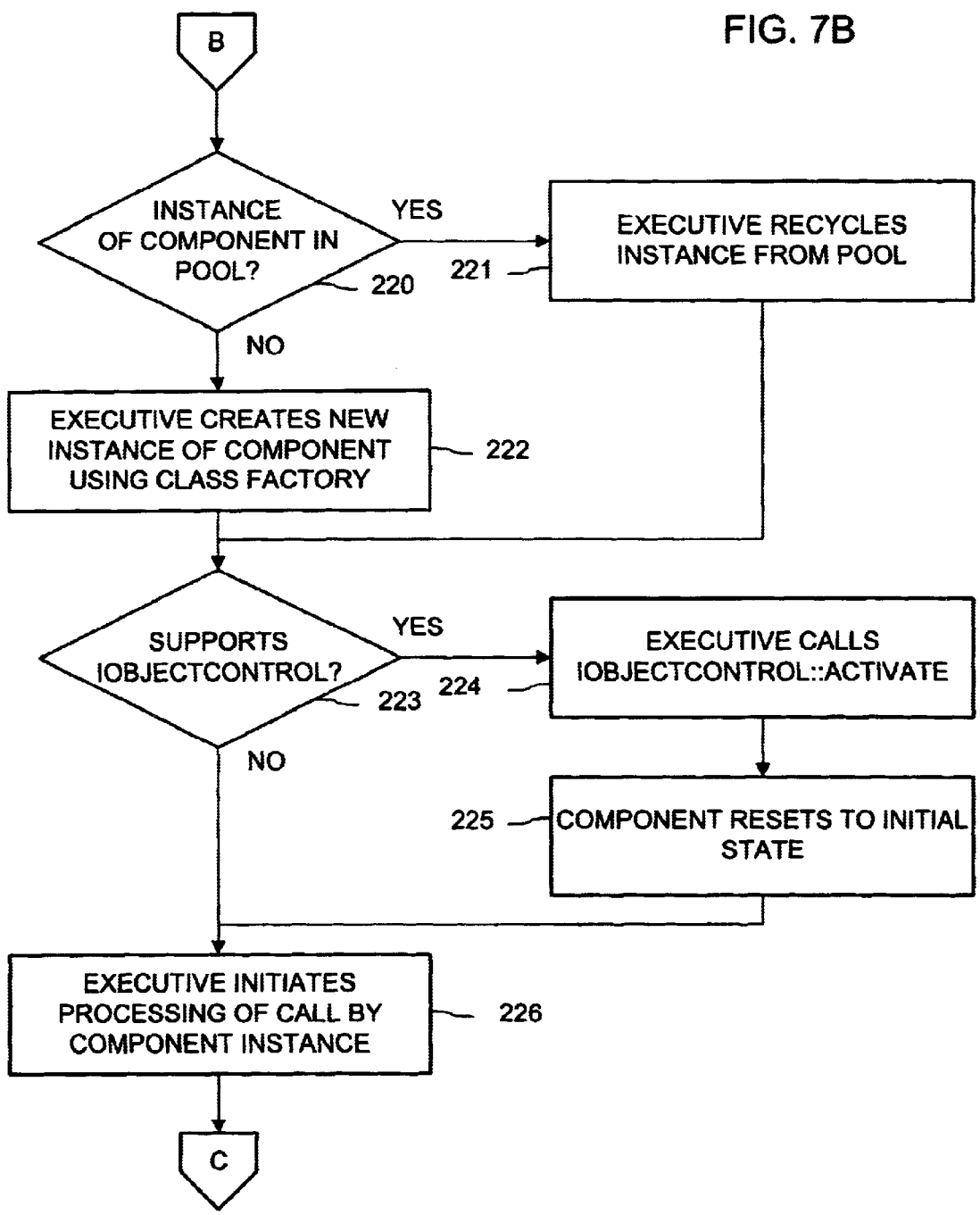

If the call is to other than the IUnknown functions and the component is deactivated (or in the case of a QueryInterface call where the server application component's support for the requested interface is not known), the transaction server executive 80 proceeds to activate the server application component 86 in steps 220–224 of FIG. 7B. As indicated at step 220, the transaction server executive 80 first checks whether there is an instance of the server application component in the component pool 180 (FIG. 6). If so, the transaction server executive 80 activates the server application component by recycling the instance of the component from the component pool 180, such as by taking the reference to the instance from a list of instances held in the component pool 180.

Otherwise, if the transaction server executive 80 does not find an instance of the server application component 86 in the component pool 180, the transaction server executive 80 creates a new instance of the server application component at step 222, such as by loading the server application component's DLL 120 (FIG. 3) into the memory 22 of the server computer 84 (if not already loaded) and calling the IClassFactory::CreateInstance function on the component's class factory 122 (FIG. 3). The resulting new instance of the server application component 86 is in its initial, post-construction state.

After creating or recycling an instance of the server application component, the transaction server executive 80 further checks at step 223 whether the server application component supports the IObjectControl interface, such as by issuing a QueryInterface designating the IObjectControl interface to the server application component. If the IObjectControl interface is supported, the transaction server executive 222 calls the IObjectControl::Activate function of the instance at step 224. This causes the instance to reset itself to its initial, post-construction state at step 225. This instance then becomes the activated server application component 86.

At step 226, the transaction server executive 80 then passes the client program's call to the just activated server application component 86 (i.e., initiates processing the call by the appropriate function of the server application component).

After the client program's call is processed at steps 211 or 225, the process 200 proceeds at steps 230–231 of FIG. 7C. Steps 230–231 indicate steps that may occur before a next call from the client program 134 at step 207, and cause deactivation of the server application component 86. At step 230, the server application component 86 may request deactivation before returning from processing the client program's call. Preferably, the server application component 86 requests deactivation when its state is no longer retained, such as when its work in a transaction is complete or when the server application component is stateless. As described above, the server application component 86 requests deactivation by calling the SetComplete or SetAbort functions.

Alternatively, at step 231, after the client program's call to the server application component 86 returns, the client program 134 may commit or abort a transaction in which the server application component is enlisted.

On the occurrence of either of the events in steps 230–231, the transaction server executive 80 proceeds to deactivate the server application component in steps 232–239. At step 232, the transaction server executive 80 checks whether the server application component 86 supports the IObjectControl interface.

When the IObjectControl interface is not supported, the transaction server executive cannot pool and recycle the instance of the server application component 86. Accordingly, the transaction server executive 80 deactivates the server application component 86 by releasing its reference to the component's instance at step 233, such as by calling the component's IUnknown::Release function. This causes the instance of the server application component 86 to release its resources and destroy its instance data structure 102 (FIG. 3). Resources released by the instance that were allocated from the resource dispenser 144 are reclaimed at step 235.

If the server application component 86 supports the IObjectControl interface, the transaction server executive 80 instead initiates the IObjectControl::Deactivate function of the component at step 236. The component's implementation of the Deactivate function preferably releases any resources that the instance has acquired at step 237.

At step 238, the transaction server executive 80 calls the IObjectControl::CanBePooled function on the server application component 86 to determine whether the component support pooling and recycling. If the CanBePooled function returns true, the transaction server executive 80 pools the instance of the server application component in the component pool 180. In either case, any resources released by the instance that were allocated from the resource dispenser 144 are reclaimed at step 235.

If neither event in steps 230–231 occurs, the process 200 continues at step 207 (FIG. 7A) with the next call from the client program 134 to the server application component 86.

Figure 7D:
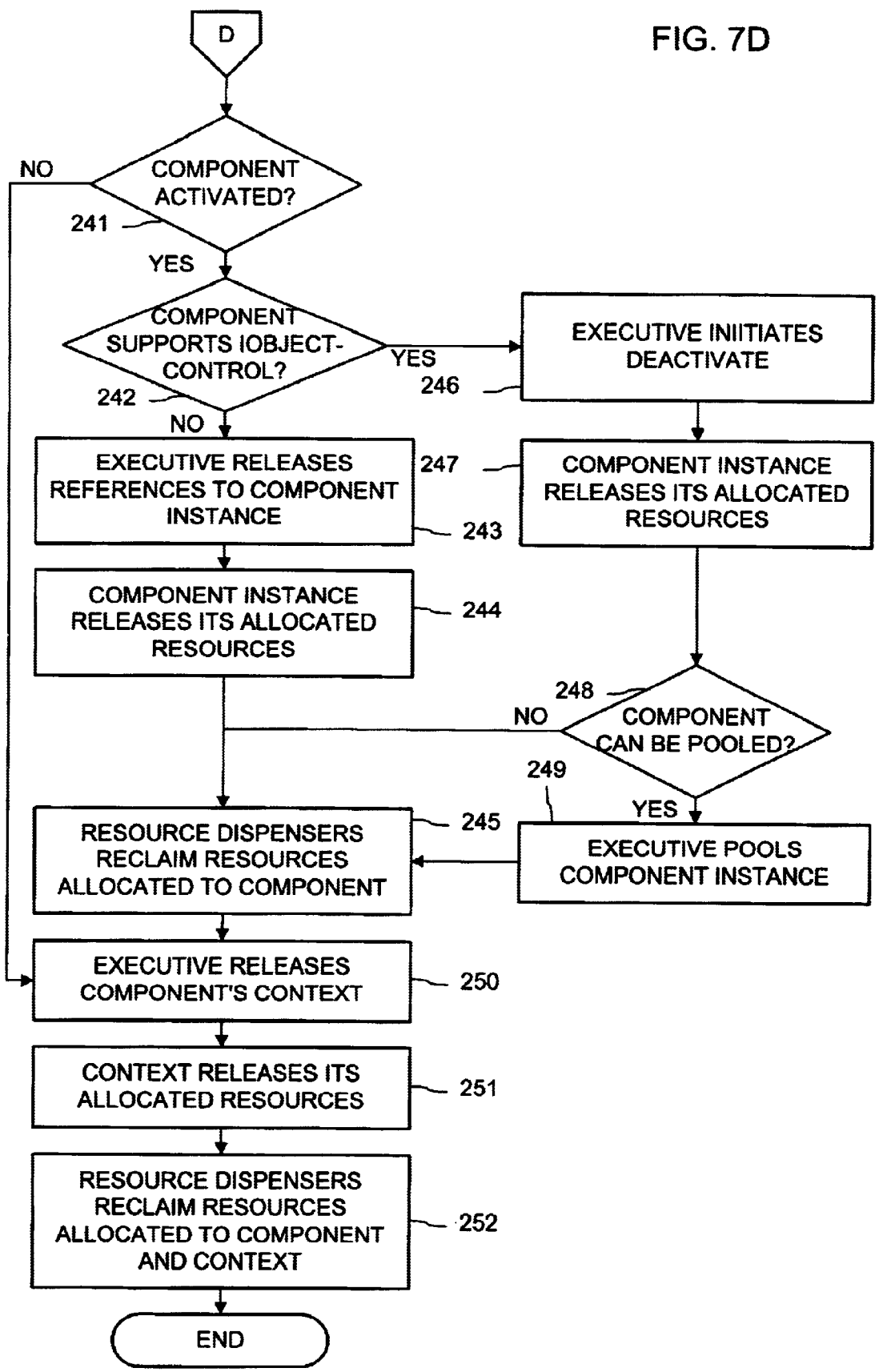

As indicated at step 240 (FIG. 7A), when the client program's call to the IUnknown::Release function releases the last client reference to the server application component 86, the transaction server executive 80 finally destroys the server application component 86 at steps 241–246 (FIG. 7D). As indicated at step 241, if the component is still activated, the transaction server executive 80 first deactivates the current instance of the component in steps 242–249 (which are similar to steps 232–239 of FIG. 7C discussed above). As shown at step 249, this still may result in pooling the instance of the server application component, which may later by recycled for use in activating the server application component in a new context. The transaction server executive 80 then completes destruction of the server application component 86 by releasing the component context object 136 which the executive implicitly associates with the server application component at step 250. This causes the component context object 136 to release its resources at step 251. If the component context object contains a transaction property object 150 (indicating the component is participating in a transaction), the release of the component context object 136 also causes an attempt to commit the transaction. Resources released by the server application component 86 and component context object are reclaimed at step 252. This ends the instance stream of the server application component created by the client program's request at step 204 (FIG. 7A).

Interfaces and API Functions for Component Activation and Deactivation

With reference again to FIG. 2, the IObjectContext interface 139 is an interface of the system provided component context object 138. The IObjectContext interface 139 is used by the server application component 86 to create additional server application components, and to participate in the determination of transaction outcomes. The illustrated IObjectContext interface 139 has the following form (in the C programming language):

DECLARE_INTERFACE_(IObjectContext, IUnlknown)
{
　//IUnknown functions
　HRESULT QueryInterface(THIS_REFIID riid, LPVOID FAR*ppvObj);
　ULONG AddRef(THIS);
　ULONG Release(THIS);
　//IObjectContext functions
　HRESULT CreateInstance(THIS_REFCLSID relsid, REFIID riid, LPVOID FAR*ppvObj);
　HRESULT SetComplete(THIS);
　HRESULT SetAbort(THIS);
　HRESULT EnableCommit(THIS);
　HRESULT DisableCommit(THIS);
　BOOL IsInTransaction(THIS);
{;

The Create Instance function is called by the server application component to create a new server application component with a context (i.e., client, activity and transaction) that is derived or inherited from the calling server application component. In its call, the server application component passes the parameters, "relsid," "riid," and "ppvObj." The "relsid" is a class identifier that specifies the new server application component to be created. The "riid" parameter is an interface identifier that specifies which interface of the new server application component is to be used by the calling server application component to communicate with the new server application component. The "ppvObj" is a memory location in the calling server application component where a pointer to the specified interface is to be returned. As discussed above, the transaction server executive 80 creates a new component context object to store the context of the new server application component. The properties of the new component context object are inherited from the calling server application component.

TABLE 1

IObjectContext::CreateInstance Return Values

| Value | Description |
| --- | --- |
| S_OK | The object was created and a reference to it is returned in the ppvObj parameter. |
| REGDB_E_CLASSNOTREG | The component specified by rclsid is not registered as a COM component. |
| E_OUTOFMEMORY | There is not enough memory available to instantiate the object. |
| E_INVALIDARG | The argument passed in the ppvObj parameter is invalid. |
| E_FAIL | A server failure occurred. |
| E_UNEXPECTED | An unexpected error occurred. This can occur if one object passes its IObjectContext pointer to another object and the other object calls CreateInstance using this pointer. An IObjectContext pointer is not valid outside the context of the object that originally obtained it. |

The SetComplete function is called by the server application component 86 on return from a client call to indicate that the component has completed processing the work requested by the client, and its state is not to be retained when returning from the method call that first entered the context (i.e., the method call from the client program). No action is taken until the component returns from the client's method call. On return from the client's method call, the transaction server executive 80 deactivates the component, causing its state to be destroyed. Any resources held by the component are released for other uses. By default, where the component has not called either SetComplete or SetAbort before return from the client's method call, the component's state is retained through a subsequent method call to the component. When the component is executing in the scope of a transaction, the server application component's call to SetComplete also indicates that the component agrees that its transactional updates can be committed. The SetComplete function returns a value to the caller (i.e., the component) as shown in the following table:

TABLE 2

IObjectContext::SetComplete Return Values

| Value | Description |
| --- | --- |
| S_OK | The component will be deactivated and its state destroyed upon its return from the client's method call. |
| E_UNEXPECTED | An unexpected error occurred. This can occur if one object passes its IObjectContext pointer to another object and the other object calls SetComplete using this pointer. An IObjectContext pointer is not valid outside the context of the object that originally obtained it. |

The SetAbort Function is called by the server application component 86 to indicate that the component has completed processing its work for the client, and its state is not to be retained when returning from the method call that first entered the context (i.e., the method call from the client program). As with the SetComplete function, no action is taken until the component returns from the client's method call. On return from the client's method call, the transaction server executive 80 deactivates the component, causing its state to be destroyed. Any resources held by the component are released for other uses. By default, where the component has not called either SetComplete or SetAbort before return from the client's method call, the component's state is retained through a subsequent method call to the component. When the component is executing in the scope of a transaction, the server application component's call to SetAbort also indicates that the component's transactional updates must be aborted. The SetAbort function returns a value to the caller (i.e., the component) as shown in the following table:

TABLE 3

IObjectContext::SetAbort Return Values

| Value | Description |
| --- | --- |
| S_OK | The call to SetComplete succeeded and the transaction will be aborted. |
| E_UNEXPECTED | An unexpected error occurred. This can occur if one object passes its IObjectContext pointer to another object and the other object calls SetAbort using this pointer. An IObjectContext pointer is not valid outside the context of the object that originally obtained it. |

The transaction server executive 80 provides the SafeRef API function for use by the server application component to obtain a safer reference to itself that can be passed to another program. The SafeRef API function of the illustrated transaction server executive 80 has the following form (in the C programming language):

void* SafeRef (REFIID riid, UNKNOWN*punk);

When the server application component is to pass a self-reference to the client program 134 or another server application component, the server application component 86 calls the SafeRef function first and passes the safe reference returned from the function. This is to ensure that all calls to the server application component are made through the transaction server executive. Otherwise, if the server application component passes a direct self reference, the reference would become invalid when the server application component is subsequently deactivated. The server application component specifies the interface that is to be passed to another program by its interface ID with the riid parameter. The pUnk parameter is a reference to an interface on the current instance of the server application component. The SafeRef API function returns a value as shown in the following table.

TABLE 4

SafeRef Return Values

| Value | Description |
| --- | --- |
| Non-Null | A safe reference to the interface specified in the riid parameter. |
| NULL | The server application component requested a safe reference on an object other than itself or the interface specified by the riid parameter is not implemented by the server application component. |

The transaction server executive 80 also provides a GetObjectContext API function that the server application component 86 can use to obtain a reference to the IObjectContext interface on its component context object 136, which the server application component can then use to create another server application component that inherits its context (including the transaction property object). The GetObjectContext API function of the illustrated transaction server executive has the following form (in the C programming language).

HRESULT GetObjectContext
        (IObjectContext**pplnstanceContext);

The pplnstanceContext parameter is a storage location of the server application component where the GetObjectContext API function is to return the IObjectContext interface pointer. The GetObjectContext API function returns a value as shown in the following table.

TABLE 5

GetObjectContext Return Values

| Value | Description |
|---|---|
| S_OK | A reference to the IObjectContext interface of the server application component's component context object is returned in the ppInstanceContext parameter. |
| E_INVALIDARG | The argument passed in the ppInstanceContext parameter is invalid. |
| E_UNEXPECTED | An unexpected error occurred. |
| CONTEXT_E_NOCONTEXT | The server application component doesn't have a component context object, such as because the component was not created under the transaction server executive's control. |

With reference still to FIG. 2, the IObjectControl interface can be implemented on the server application component 86 to indicate support for instance pooling and recycling and to provide context-specific initialization and clean-up for the component upon activation and deactivation, respectively. The IObjectControl interface in the illustrated execution environment has the member functions summarized in the following table:

TABLE 6

IObjectControl member functions.

| Function | Description |
|---|---|
| Activate | Allows an object to perform context-specific initialization whenever it's activated. This method is called by the Transaction Server run-time environment before any other methods are called on the object. |
| CanBePooled | Allows an object to notify the Transaction Server run-time environment of whether it can be pooled for reuse. Return TRUE if you want instances of this component to be pooled, or FALSE if not. |
| Deactivate | Allows an object to perform whatever cleanup is necessary before it's recycled or destroyed. This method is called by the Transaction Server run-time environment whenever an object is deactivated. |

The IObjectControl member functions have the following form (shown in the C programming language):
HRESULT IObjectControl::Activate ( );
void IObjectControl::Deactivate ( );.
BOOL IObjectControl::CanBePooled ( );

Having described and illustrated the principles of our invention with reference to an illustrated embodiment, it will be recognized that the illustrated embodiment can be modified in arrangement and detail without departing from such principles. It should be understood that the programs, processes, or methods described herein are not related or limited to any particular type of computer apparatus, unless indicated otherwise. Various types of general purpose or specialized computer apparatus may be used with or perform operations in accordance with the teachings described herein. Elements of the illustrated embodiment shown in software may be implemented in hardware and vice versa.

In view of the many possible embodiments to which the principles of our invention may be applied, it should be recognized that the detailed embodiments are illustrative only and should not be taken as limiting the scope of our invention. Rather, we claim as our invention all such embodiments as may come within the scope and spirit of the following claims and equivalents thereto.

We claim:

1. In a computer, a system service for providing an execution environment for scalable application components, comprising:

code for, responsive to a request from a client program to create an application component, returning to the client program a reference through the system service to the application component although the application component is not yet instantiated;

code for, responsive to a call from the client program using the reference, creating an instance of the application component in an initial state so as to activate the application component for processing the call; and code for releasing the instance while the client program retains the reference through the system service to the application component so as to deactivate the application component;

wherein the code for creating the instance and the code for releasing the instance iteratively create and release a stream of instances of the application component while the client program holds the same reference, and upon each instance of activation in the stream, the initial state excludes persisted properties created by a call during a previous activation.

2. The system service of claim 1 wherein the code for releasing the instance does so responsive to a request from the application component.

3. The system service of claim 1 further comprising:

code for associating the application component in a transaction; and wherein the code for releasing the instance releases the instance responsive to the client program committing or aborting the transaction.

4. The system service of claim 1 further comprising:

code for pooling the instance during deactivation of the application component and for recycling the instance in a later activation of the application component.

5. A method of enhancing scalability of an application run on a computer, the application having an instantiable application component, the method comprising:

responsive to a request of a client to create an application component, returning to the client a reference to the application component not yet instantiated in a run-time environment;

passing calls from the client to the application component through the run-time environment;

on receiving in the run-time environment a call from the client using the reference to the application component at a time when the application component is deactivated, activating the application component by providing an instance of the application component in an initial data state and under control of the run-time environment;

performing work for the client by the instance of the application component responsive to one or more calls from the client using the reference; and on the instance completing the work for the client, deactivating the application component;

wherein the run-time environment activates and deactivates instances of the application component according to a transaction processing protocol while the client program holds the same returned reference, and upon each instance activation, the application component is returned to the initial data state.

6. The method of claim 5 wherein deactivating the application component comprises:

releasing the instance of the application component and any resources held by the instance.

7. The method of claim 5 further comprising:

when deactivating the application component, adding the instance to a pool of component instances; and when activating the application component, providing the instance of the application component from the instances in the pool if such instance is found in the pool.

8. The method of claim 5 further comprising:

deactivating the application component on a request from the application component to the run-time environment indicating completion of the work.

9. The method of claim 5 wherein the application component performs the work as part of a transaction for the client further, the method further comprising:

deactivating the application component on the client committing or aborting the transaction.

10. A computer-readable storage medium having computer-executable instructions stored thereon for causing a computer to perform the steps of the method recited in claim 5.

11. A method of enhancing scalability of an application run on a server computer, the application having an instantiable application component, the method comprising:

responsive to a request of a client to create an application component, returning to the client a reference to an uninstantiated application component in a run-time environment;

creating an instance of the application component run under control of the run-time environment, the instance having an initial data state at creation and functions implemented in the application component;

calling by the client using the reference one or more application component functions that may modify the data state of the instance;

thereafter, deactivating the instance of the application component, when the application is deactivated, releasing the data state of the instance;

retaining the reference to the application component in the run-time environment by the client while the application component is deactivated; and after deactivation of the application component, reactivating the application component responsive to the client calling an application component function using the reference;

wherein the client program uses the same returned reference to access the application component, while the application component is deactivated and reactivated in a stream of instances, and upon each activated instance, the application component is returned to the initial data state.

12. A computer operating environment for scalable, component-based server applications, comprising:

a run-time service for executing application components in a system process;

an instance creation service operative, responsive to a request of a client, to return a reference to the application component through the run-time service to the client, where the application component is in a deactivated condition with no data state held in memory; and the run-time service being operative, responsive to a call from the client using the reference to a member function implemented in the application component when the application component is in the deactivated condition, to activate the application component into an activated condition where the application component has a post-creation data state in memory;

wherein the client uses the same returned reference to access the application component, while the application component is activated and deactivated in a stream of instances, and upon each activated instance, the application component is returned to the post creation state which excludes persisted data from a previous activation.

13. The computer operating environment of claim 12 wherein the run-time service is further operative, responsive to an indication that the application component has completed work for the client, to return the application component into the deactivated condition while the client retains the reference through the run-time service to the client.

14. The computer operating environment of claim 13 wherein the indication is a call from the client to commit or abort a transaction encompassing the work.

15. The computer operating environment of claim 13 wherein the application component initiates the indication on returning from a call by the client, whereby the application component is deactivated immediately on return from the client's call without further action by the client.

16. The computer operating environment of claim 15 further comprising:

a component context associated by the run-time service with the application component and providing an interface having a member function that the application component calls to initiate the indication.

17. The computer operating environment of claim 16 wherein the application component performs the work within a transaction and wherein calling the member function of the component context causes the transaction to abort.

18. A method of enhancing scalability of server application components, the method comprising:

returning an interface reference to an uninstantiated server application component in response to receiving a server application component creation request from a client;

indicating, in response to a method query request from the client while the server application component remains uninstantiated, whether the server application component once instantiated would provide an implementation for an invokable method specified by the client in the method query request; and instantiating the server application component in response to receiving an invocation of the invokable method from the client, wherein the server application component is instantiated in an initial data state;

invoking the invokable method on the instantiated server application component;

receiving a deactivation request from the instantiated server application component; and deactivating the instantiated server application component in response to the deactivation request upon completion of the invokable method;

wherein the client uses the same returned interface reference to invoke the server application component, while the server application component is deactivated and reactivated in a stream of instances, and upon each activated instance, the application component is returned to the initial data state.

* * * * *

UNITED STATES PATENT AND TRADEMARK OFFICE
CERTIFICATE OF CORRECTION

PATENT NO. : 6,631,425 B1
DATED : October 7, 2003
INVENTOR(S) : Helland et al.

It is certified that error appears in the above-identified patent and that said Letters Patent is hereby corrected as shown below:

Title page,
Item [54], Title, "DEACTIVATION OR SERVER" should be -- DEACTIVATION OF SERVER --.

Column 7,
Line 54, "including a GetObjectContext and a SafeRef API" should be -- including GetobjectContext and SafeRef API --.

Column 12,
Line 7, "object 136 to represent" should be -- object 138 to present --.
Line 50, "finction to indicate" should be -- function to indicate --.

Column 13,
Lines 34, 42 and 43-44, "CoCreatelnstance" should be -- CoCreateInstance --

Column 14,
Lines 8, 17, 18, 21, 24, 34 and 60, "CoCreatelnstance" should be -- CoCreateInstance --.
Lines 45-46, "component object contect" should be -- component context object --.
Line 50, "omponent context" should be -- component context --.

Column 15,
Line 63, "CoCretelinstance" should be -- CoCreateInstance --.

Column 17,
Line 9, "component context object 136" should be -- component context object 138 --.

Column 18,
Lines 20-21, "in a different instance streams," should be -- in different instance streams --.
Line 38, "and obtain an interface" should be -- and obtains an interface --.

Column 19,
Lines 13 and 16-17, "CoCreatelinstance" should be -- CoCreateInstance --.
Lines 19 and 20, "component context object 136" should be -- component content object 138 --.
Lines 33 and 67, "Querylnterface" should be -- QueryInterface --.

UNITED STATES PATENT AND TRADEMARK OFFICE
CERTIFICATE OF CORRECTION

PATENT NO. : 6,631,425 B1
DATED : October 7, 2003
INVENTOR(S) : Helland et al.

It is certified that error appears in the above-identified patent and that said Letters Patent is hereby corrected as shown below:

Column 20,
Lines 5, 35 and 63, "QueryInterface" should be -- QueryInterface --.
Line 55, "CoCreateInstance" should be -- CoCreateInstance --.

Column 22,
Lines 10-11, 12-13 and 16-17, "component context object 136" should be -- component context object 138 --.
Line 36, "IUnlknown)" should be -- IUnknown --.
Line 38, "QueryInterface" should be -- QueryInterface --.
Line 44, "CoCreate l nstance" should be -- CoCreateInstance --.
Lines 44, 57 and 58, "relsid" should be -- rclsid --.
Line 45, "FAR*ppvOBJ" should be -- FAR* ppvOBJ --.

Column 23,
Line 62, "Function" should be -- function --.

Column 25,
Line 2, "component context object 136" should be -- component context object 138 --.
Lines 10 and 11, "pp l nstanceContext" should be -- ppInstanceContext --.

Column 27,
Line 57, "compenent," should be -- component; --.

Signed and Sealed this

Thirty-first Day of August, 2004

JON W. DUDAS
*Director of the United States Patent and Trademark Office*

UNITED STATES PATENT AND TRADEMARK OFFICE
CERTIFICATE OF CORRECTION

PATENT NO.     : 6,631,425 B1
DATED          : October 7, 2003
INVENTOR(S)    : Helland et al.

It is certified that error appears in the above-identified patent and that said Letters Patent is hereby corrected as shown below:

Title page,
Item [54], Title, "DEACTIVATION OR SERVER" should be -- DEACTIVATION OF SERVER --.

Column 7,
Line 54, "including a GetObjectContext and a SafeRef API" should be -- including GetobjectContext and SafeRef API --.

Column 12,
Line 7, "object 136 to represent" should be -- object 138 to represent --.
Line 50, "finction to indicate" should be -- function to indicate --.

Column 13,
Lines 34, 42 and 43-44, "CoCreatelnstance" should be -- CoCreateInstance --

Column 14,
Lines 8, 17, 18, 21, 24, 34 and 60, "CoCreatelnstance" should be
-- CoCreateInstance --.
Lines 45-46, "component object context" should be -- component context object --.
Line 50, "omponent context" should be -- component context --.

Column 15,
Line 63, "CoCreatelnstance" should be -- CoCreateInstance --.

Column 17,
Line 9, "component context object 136" should be -- component context object 138 --.

Column 18,
Lines 20-21, "in a different instance streams," should be -- in different instance streams --.
Line 38, "and obtain an interface" should be -- and obtains an interface --.

Column 19,
Lines 13 and 16-17, "CoCreatelnstance" should be -- CoCreateInstance --.
Lines 19 and 20, "component context object 136" should be -- component context object 138 --.
Lines 33 and 67, "Querylnterface" should be -- QueryInterface --.

UNITED STATES PATENT AND TRADEMARK OFFICE
CERTIFICATE OF CORRECTION

PATENT NO.   : 6,631,425 B1
DATED        : October 7, 2003
INVENTOR(S)  : Helland et al.

It is certified that error appears in the above-identified patent and that said Letters Patent is hereby corrected as shown below:

Column 20,
Lines 5, 35 and 63, "QueryInterface" should be -- QueryInterface --.
Line 55, "CoCreateInstance" should be -- CoCreateInstance --.

Column 22,
Lines 10-11, 12-13 and 16-17, "component context object 136" should be -- component context object 138 --.
Line 36, "IUnlknown)" should be -- IUnknown --.
Line 38, "QueryInterface" should be -- QueryInterface --.
Line 44, "CoCreate l nstance" should be -- CoCreateInstance --.
Lines 44, 57 and 58, "relsid" should be -- rclsid --.
Line 45, "FAR*ppvOBJ" should be -- FAR* ppvOBJ --.

Column 23,
Line 62, "Function" should be -- function --.

Column 25,
Line 2, "component context object 136" should be -- component context object 138 --.
Lines 10 and 11, "pp l nstanceContext" should be -- ppInstanceContext --.

Column 27,
Line 57, "component," should be -- component; --.

This certificate supersedes Certificate of Correction issued August 31, 2004.

Signed and Sealed this

Twenty-second Day of March, 2005

JON W. DUDAS
*Director of the United States Patent and Trademark Office*